(12) United States Patent  (10) Patent No.: US 8,126,515 B2
Watanabe et al.  (45) Date of Patent: Feb. 28, 2012

(54) SEMICONDUCTOR INTEGRATED CIRCUIT, NONCONTACT/CONTACT ELECTRONICS DEVICE USING THE SAME AND MOBILE TERMINAL

(75) Inventors: Kazuki Watanabe, Hino (JP); Hisataka Tsunoda, Midori (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 258 days.

(21) Appl. No.: 12/629,910

(22) Filed: Dec. 3, 2009

(65) Prior Publication Data

US 2010/0144402 A1  Jun. 10, 2010

(30) Foreign Application Priority Data

Dec. 9, 2008 (JP) .................................. 2008-312938

(51) Int. Cl.
*H04B 1/38* (2006.01)
(52) U.S. Cl. ........ 455/572; 455/129; 455/333; 455/558; 455/343.1; 307/149; 363/126
(58) Field of Classification Search .................. 455/572, 455/129, 333, 558, 343.1; 307/149; 363/126
See application file for complete search history.

(56) References Cited

U.S. PATENT DOCUMENTS 6,831,378 B2 * 12/2004 Watanabe et al. ............. 307/149
(Continued)

FOREIGN PATENT DOCUMENTS

EP  1 174 820 A1  7/2000
(Continued)

*Primary Examiner* — Sanh Phu
(74) *Attorney, Agent, or Firm* — Miles & Stockbridge P.C.

(57) ABSTRACT

The semiconductor integrated circuit includes: a pair of antenna terminals; a rectifier; a source-voltage terminal; a shunt regulator; a series regulator. When the voltage of the inside source line rises to or above a first set voltage, the shunt regulator passes a pull-down current through a pull-down transistor. When the voltage of the inside source line drops to or below the second set voltage, the series regulator passes a pull-up current through a pull-up transistor. The first set voltage is set to be higher than the second set voltage in voltage level. With the semiconductor integrated circuit, the competition of actions of the two regulators is prevented. The semiconductor integrated circuit is arranged to work in contact and noncontact operation modes, and a stable source voltage can be supplied to an internal circuit thereof.

11 Claims, 7 Drawing Sheets

U.S. PATENT DOCUMENTS

| | | |
|---|---|---|
| 7,505,794 B2 | 3/2009 | Watanabe et al. |
| 7,999,417 B2 * | 8/2011 | Kato et al. ............... 307/149 |
| 2007/0155442 A1 | 7/2007 | Watanabe et al. |
| 2007/0249398 A1 * | 10/2007 | Watanabe et al. ......... 455/558 |
| 2009/0160652 A1 * | 6/2009 | Watanabe et al. ......... 340/572.1 |

FOREIGN PATENT DOCUMENTS

JP     2000-113148 A     4/2000

* cited by examiner

SEMICONDUCTOR INTEGRATED CIRCUIT, NONCONTACT/CONTACT ELECTRONICS DEVICE USING THE SAME AND MOBILE TERMINAL

CLAIM OF PRIORITY

The Present application claims priority from Japanese application JP 2008-312938 filed on Dec. 9, 2008, the content of which is hereby incorporated by reference into this application.

FIELD OF THE INVENTION

The present invention relates to a semiconductor integrated circuit, a noncontact/contact electronic device using the same, and a mobile terminal device. Particularly, it relates to a technique useful for supplying a stable source voltage to an internal circuit in a semiconductor integrated circuit arranged to work in noncontact and contact operation modes.

BACKGROUND OF THE INVENTION

A contact IC card which incorporates a semiconductor integrated circuit having CPU (Central Processing Unit) and a function like a memory, and which has a contact terminal of the semiconductor integrated circuit on a surface thereof has been in common use in finance and other fields.

Such contact IC card is managed by CPU or the like in write on and erase from a memory and has e.g. a cipher processing function, which actualizes the high security performance of the contact IC card. In regard to a device such as CPU, which realizes the function like this, the breakdown voltage has been lowering owing to the scale-down of semiconductor processes in recent years, and therefore a source voltage supplied to CPU is restricted to a level which never exceeds the breakdown voltage of the device. For this purpose, it is common to supply a source voltage to CPU through a regulator for restricting the voltage level of a source-voltage terminal.

However, a noncontact IC card, which does not have a power source such as a battery and which operates producing a source voltage for allowing an internal circuit to work from electromagnetic waves received through an antenna, has been used in the fields of transport, etc. This type of noncontact IC card receives input data, which have been transmitted by means of modulated electromagnetic waves from a reader/writer (interrogator), performs a signal processing of input data thus received to produce output data, and modulates electromagnetic waves by use of a load between antenna terminals varying according to the output data to transmit output data to a reader/writer (interrogator).

Like a contact IC card, a noncontact IC card has CPU, a memory, etc. therein provided for achieving the functions as described above. Therefore, it requires that CPU and other parts should be supplied with source voltages restricted so as not to exceed the breakdown voltages of the elemental devices.

The patent document, U.S. Pat. No. 7,505,794 discloses a method for solving the problem that as to a series regulator incorporated in a noncontact IC card, a compensation current for load variation deteriorates the quality of communication with a reader/writer, whereas a current of a shunt regulator provided in the noncontact IC card counterbalances the variation of current of a load-modulation circuit. According to the method described in U.S. Pat. No. 7,505,794, the series regulator operates and the shunt regulator stops in case that the noncontact IC card transmits a signal to a reader/writer, whereas the series regulator stops and the shunt regulator works except in case that a signal is transmitted to the reader/writer.

A dual-way IC card having both the function of a contact IC card and the function of a noncontact IC card is becoming popular. In a dual-way IC card, either a source voltage supplied through a regulator from a source-voltage terminal, which is a contact terminal, or a source voltage produced from electromagnetic waves received through an antenna is selected according to its working condition. The selected source voltage is supplied to an internal circuit of e.g. CPU incorporated in the dual-way IC card. The electric power supplied through the source-voltage terminal or antenna allows the internal circuit of the dual-way IC card to have both the function of a contact IC card and the function of a noncontact IC card.

On the other hand, the patent document, Japanese Unexamined Patent Publication No. JP-A-2000-113148 discloses a method for solving the problem that in a combination card having the function of a contact IC card and the function of a noncontact IC card, electric power leaks out from a source terminal serving as a contact terminal used in a contact mode because the contact terminal is put in conduction in a noncontact mode. Specifically, the problem is that under the condition that a leakage from the contact terminal takes place in the noncontact mode, if a voltage higher than that of the inside of IC chip is applied to the source terminal during operation in the noncontact mode, IC chip will be under an electrical attack. Therefore, the method described in JP-A-2000-113148 includes: connecting a signal switch between the contact terminal and an internal circuit of the combination card; connecting a power-on switch between the contact terminal used as a source terminal and the internal circuit of the combination card; and keeping off the signal switch and power-on switch in a noncontact mode operation. The arrangement like this makes it possible to electrically isolate all the contact terminals from the internal circuit of the combination card during operation in the noncontact mode.

SUMMARY OF THE INVENTION

Prior to the invention, the inventors were engaged in research and development of a semiconductor integrated circuit incorporated in a dual-way IC card serving as a contact IC card and a noncontact IC card. Incidentally, a contact IC card works using a source voltage supplied through a source-voltage terminal used as a contact terminal, whereas a noncontact IC card operates using a source voltage produced from electromagnetic waves received through an antenna.

The detail of the study on a regulator built in a semiconductor integrated circuit incorporated in such dual-way IC card, which was carried out by the inventors in the research and development, is as follows.

First, a series regulator generally used for semiconductor integrated circuits is adopted as a regulator (i.e. contact type regulator for contact use) for producing a source voltage for an internal circuit, which restricts a source voltage supplied through a source-voltage terminal used as a contact terminal to a predetermined voltage level thereby to produce the source voltage. On the other hand, as a regulator (i.e. noncontact type regulator for noncontact use) which restricts a voltage resulting from rectification of electromagnetic waves received through an antenna to the predetermined voltage level thereby to produce a source voltage for the internal circuit, a shunt regulator was adopted.

In a case where the source voltage of the inside has not reached the predetermined voltage level, the contact type series regulator works so that the inside source voltage is raised by a large pull-up current supplied through the source-voltage terminal. However, in the case of the inside source voltage over the predetermined voltage level, the contact type series regulator operates so that the inside source voltage is lowered by reducing the pull-up current supplied through the source-voltage terminal.

On the other hand, in a case where the inside source voltage has not reached the predetermined voltage level, the noncontact type shunt regulator never forces pull-down current to flow from a source line of the inside to the ground. However, when the inside source voltage level reaches the predetermined voltage level, the noncontact type shunt regulator maintains the predetermined voltage level by means of negative feedback, in which a large pull-down current is forced to flow from the source line of the inside to the ground thereby to lower the inside source voltage level.

The inventors found the problem that according to circumstances, an operational competition is caused between the contact type series regulator and noncontact regulator built in a semiconductor integrated circuit incorporated in the dualway IC card, and thus electric power is consumed uselessly.

Such competition refers to a situation in which on the condition that the inside source voltage is at the same voltage level, the contact type series regulator supplies a large pull-up current through the source-voltage terminal and in parallel, the noncontact type shunt regulator forces a pull-down current to flow from a source line of the inside to the ground. As a result, the action of pulling up the voltage of the inside source line by the contact type series regulator neutralizes the action of pulling down the inside source line by the noncontact type shunt regulator.

Especially, in a case where the noncontact type shunt regulator is lower than the contact type series regulator in restriction level, the series regulator and the shunt regulator absolutely compete with each other, and thus a large volume of electric power is consumed. The inventors also found that such competing action can not only increase the current consumption, but also cause the degradation of communication performance of the noncontact IC card as described in the patent document JP-A-2000-113148.

The invention was made as a result of the study performed by the inventors prior to the invention.

Therefore, it is an object of the invention to enables supplying a stable source voltage to an internal circuit in a semiconductor IC having a contact operation mode and a noncontact operation mode; the semiconductor IC works using a source voltage supplied through the source-voltage terminal used as a contact terminal in the contact operation mode, and it operates using a source voltage produced from electromagnetic waves received through an antenna in the noncontact operation mode.

The above and other objects of the invention and a novel feature thereof will be apparent from the description hereof and the accompanying drawings.

Of the invention herein disclosed, a preferred embodiment will be described below briefly.

A semiconductor integrated circuit (U2) according to a preferred embodiment of the invention includes: a pair of antenna terminals (LA, LB) connectable with an antenna (L1); a rectifier (B1) operable to rectify radio signals supplied to the pair of antenna terminals (LA, LB) thereby to output a direct current voltage to an inside source line ($V_{DDA}$); a source-voltage terminal ($V_{DD}$) for supply of a source voltage from outside; a shunt regulator (B2) which includes a pull-down transistor (M1) connected between the inside source line ($V_{DDA}$) and a ground ($V_{SS}$), and which passes a pull-down current (I1) through the pull-down transistor in response to a rise of a voltage of the inside source line ($V_{DDA}$) to or above a first set voltage (V1); and a series regulator (B3) which includes a pull-up transistor (M2) connected between the source-voltage terminal ($V_{DD}$) and inside source line ($V_{DDA}$), and which passes a pull-up current (I2) through the pull-up transistor in response to a fall of the voltage of the inside source line ($V_{DDA}$) to or below a second set voltage (V2). The first set voltage (V1) is set to be higher than the second set voltage (V2) in voltage level, or arranged so that it can be so set (see FIGS. 3, 5, 11 and 13).

Now, the effect achieved by the preferred embodiment of the invention herein disclosed will be described below briefly.

That is, a stable source voltage can be supplied to an internal circuit in a semiconductor integrated circuit having a contact operation mode and a noncontact operation mode.

DETAILED DESCRIPTION OF THE PREFERRED EMBODIMENTS

1. Summary of the Preferred Embodiments

Figure 1:
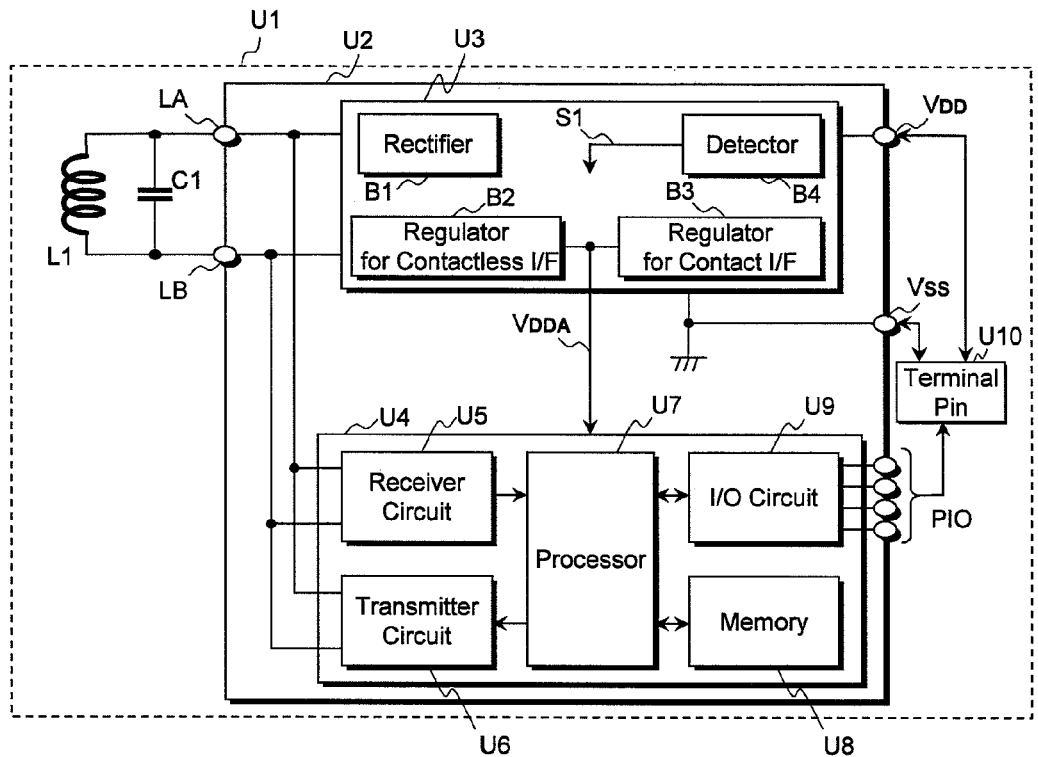
FIG. 1 is a diagram showing a configuration of a noncontact electronic device having therein a semiconductor integrated circuit according to the first embodiment of the invention.

The preferred embodiments of the invention herein disclosed will be outlined first. The reference numerals, characters or signs to refer to the drawings, which are accompanied with paired round brackets here, only exemplify what the concepts of components referred to by the numerals, characters or signs contain.

[1] A semiconductor integrated circuit (U2) according to a preferred embodiment of the invention includes: a pair of antenna terminals (LA, LB) connectable with an antenna (L1); a rectifier (B1) operable to rectify radio signals supplied to the pair of antenna terminals (LA, LB) thereby to output a direct current voltage to an inside source line ($V_{DDA}$); a source-voltage terminal ($V_{DD}$) for supply of a source voltage from outside; a shunt regulator (B2) which includes a pull-down transistor (M1) connected between the inside source line ($V_{DDA}$) and the ground ($V_{SS}$), and which passes a pull-down current (I1) through the pull-down transistor in response to a rise of a voltage of the inside source line ($V_{DDA}$) to or above a first set voltage (V1); and a series regulator (B3) which includes a pull-up transistor (M2) connected between the source-voltage terminal ($V_{DD}$) and inside source line ($V_{DDA}$) and which passes a pull-up current (I2) through the pull-up transistor in response to a fall of the voltage of the inside source line ($V_{DDA}$) to or below a second set voltage (V2). The first set voltage (V1) is set to be higher than the second set voltage (V2) in voltage level (see FIG. 3).

According to the above embodiment, a stable source voltage can be supplied to an internal circuit in a semiconductor integrated circuit having a contact operation mode and a noncontact operation mode.

According to a preferred embodiment, the shunt regulator (B2) further includes a first voltage divider (B5) connected between the inside source line ($V_{DDA}$) and ground ($V_{SS}$), and a first operational amplifier (A1) operable to control an input terminal of the pull-down transistor (M1) according to a divided voltage output from the first voltage divider (B5) and a first reference voltage ($V_{R1}$).

Figure 3:
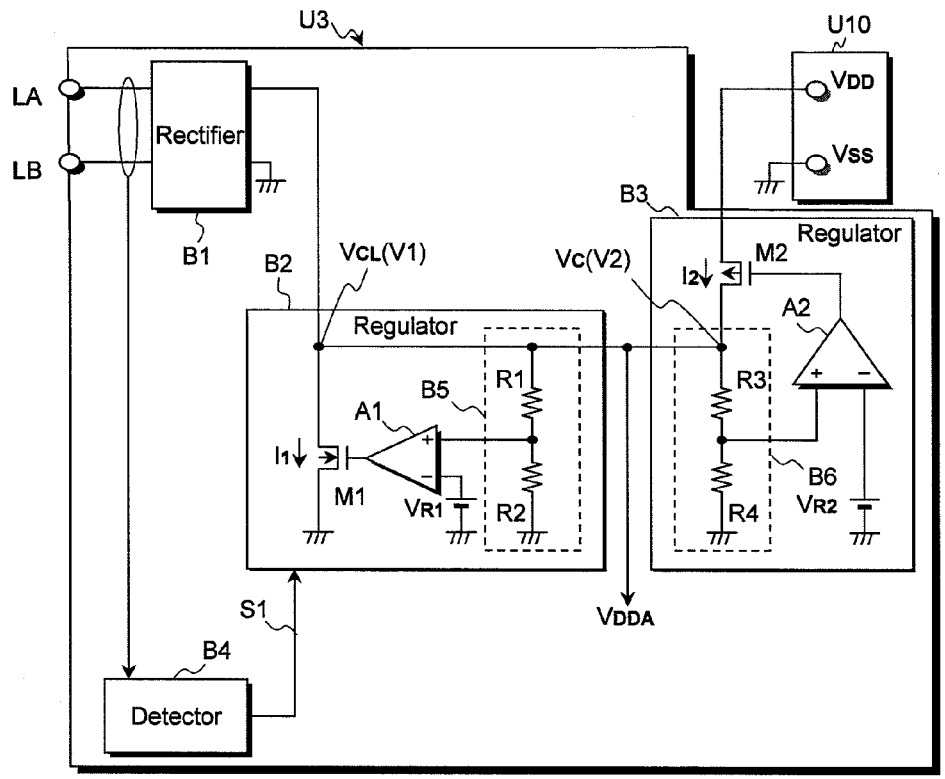
FIG. 3 is a diagram showing details of a configuration of a power-supply circuit included in the semiconductor integrated circuit shown in FIG. 1.

The series regulator (B3) further includes a second voltage divider (B6) connected between the inside source line ($V_{DDA}$) and the ground ($V_{SS}$), and a second operational amplifier (A2) operable to control an input terminal of the pull-up transistor (M2) according to a divided voltage output from the second voltage divider (B6) and a second reference voltage ($V_{R2}$) (see FIG. 3).

According to the more preferred embodiment, the pull-down transistor (M1) is an N-channel MOS transistor, and the pull-up transistor (M2) is a P-channel MOS transistor (see FIG. 3).

Figure 5:
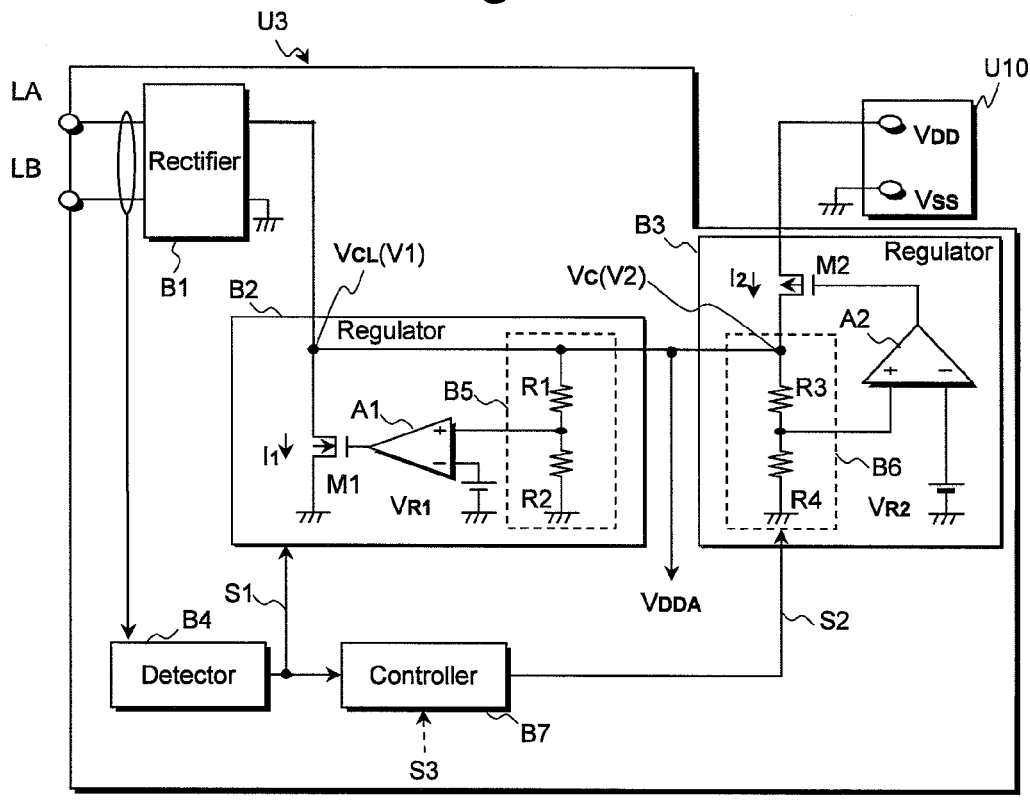
FIG. 5 is a diagram showing details of another configuration of the power-supply circuit included in the semiconductor integrated circuit shown in FIG. 1 according to the second embodiment of the invention.
Figure 11:
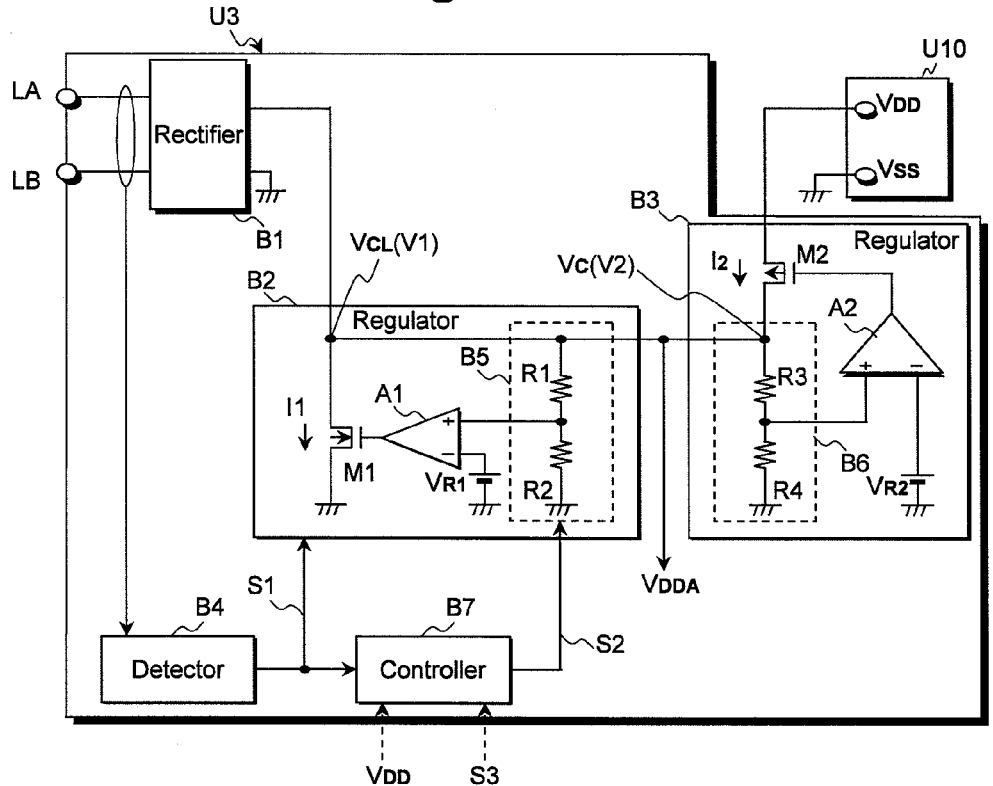
FIG. 11 is a diagram showing details of still another configuration of the power-supply circuit included in the semiconductor integrated circuit shown in FIG. 1 according to the third embodiment of the invention.
Figure 13:
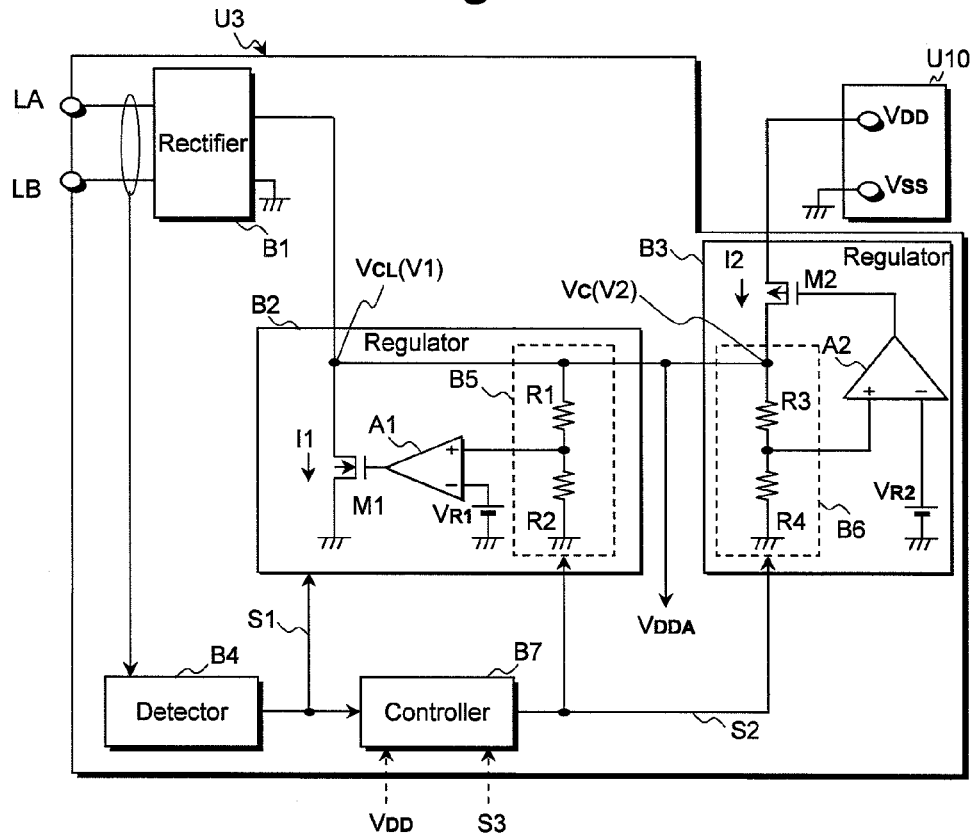
FIG. 13 is a diagram showing details of another configuration of the power-supply circuit included in the semiconductor integrated circuit shown in FIG. 1 according to the fourth embodiment of the invention.

[2] A semiconductor integrated circuit (U2) according to a preferred embodiment in terms of another aspect of the invention includes: a pair of antenna terminals (LA, LB) connectable with an antenna (L1); a rectifier (B1) operable to rectify radio signals supplied to the pair of antenna terminals (LA, LB) thereby to output a direct current voltage to an inside source line ($V_{DDA}$); a source-voltage terminal ($V_{DD}$) for supply of a source voltage from outside; a shunt regulator (B2) which includes a pull-down transistor (M1) connected between the inside source line ($V_{DDA}$) and a ground ($V_{SS}$), and which passes a pull-down current (I1) through the pull-down transistor in response to a rise of a voltage of the inside source line ($V_{DDA}$) to or above a first set voltage (V1); a series regulator (B3) which includes a pull-up transistor (M2) connected between the source-voltage terminal ($V_{DD}$) and inside source line ($V_{DDA}$), and which passes a pull-up current (I2) through the pull-up transistor in response to a fall of the voltage of the inside source line ($V_{DDA}$) to or below a second set voltage (V2); and a control section (B4, B7) connected with the shunt regulator (B2) and series regulator (B3), wherein the control section (B4, B7) can control a voltage level of the first set voltage (V1) into a level higher than a voltage level of the second set voltage (V2) in case that the shunt regulator (B2) and series regulator (B3) work in parallel (see FIGS. 5, 11 and 13).

According to the embodiment, a stable source voltage can be supplied to an internal circuit in a semiconductor integrated circuit having a contact operation mode and a noncontact operation mode.

According to a preferred embodiment, the shunt regulator (B2) further includes a first voltage divider (B5) connected between the inside source line ($V_{DDA}$) and ground ($V_{SS}$), and a first operational amplifier (A1) operable to control an input terminal of the pull-down transistor (M1) according to a divided voltage output from the first voltage divider (B5) and a first reference voltage ($V_{R1}$).

The series regulator (B3) further includes a second voltage divider (B6) connected between the inside source line ($V_{DDA}$) and the ground ($V_{SS}$), and a second operational amplifier (A2) operable to control an input terminal of the pull-up transistor (M2) according to a divided voltage output from the second voltage divider (B6) and a second reference voltage ($V_{R2}$) (see FIG. 3).

According to another preferred embodiment, the control section (B4, B7) is arranged to be able to detect supply of the radio frequency signal to the pair of antenna terminals (LA, LB).

Figure 6:
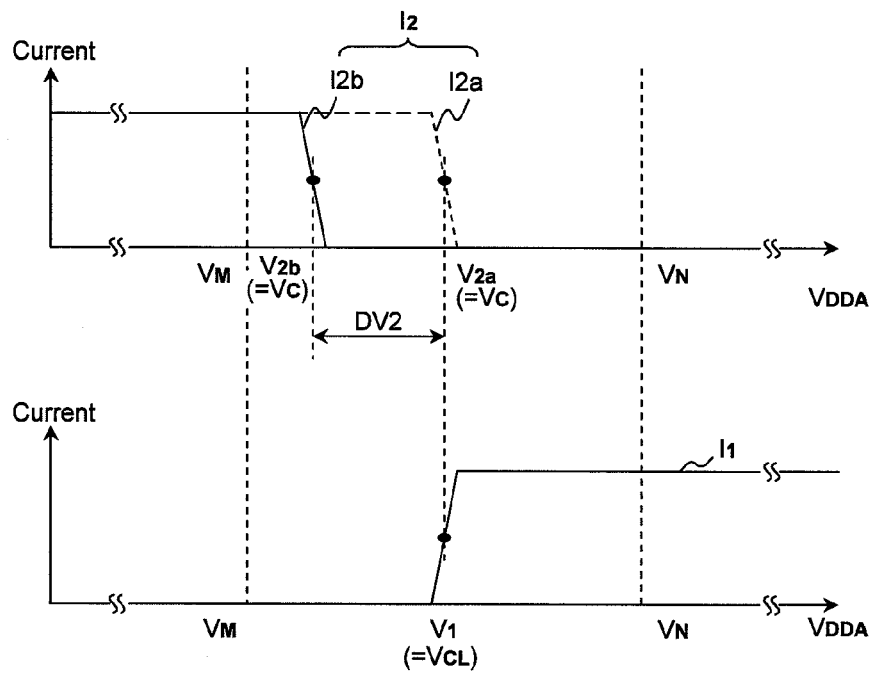
FIG. 6 is a diagram showing the dependencies of the pull-up current running through the pull-up MOS transistor of the contact type series regulator, and the pull-down current flowing through the pull-down MOS transistor of the noncontact type shunt regulator on the voltage of the inside source line in the power-supply circuit shown in FIG. 5.

The control section (B4, B7) can control the second voltage divider (B6) of the series regulator (B3) according to a result of detection of the supply of the radio frequency signal thereby to control the voltage level of the second set voltage (V2) into a level lower than the voltage level of the first set voltage (V1) (see FIGS. 5 and 6).

According to still another preferred embodiment, the control section (B4, B7) is arranged to be able to detect supply of the source voltage to the source-voltage terminal ($V_{DD}$).

Figure 12:
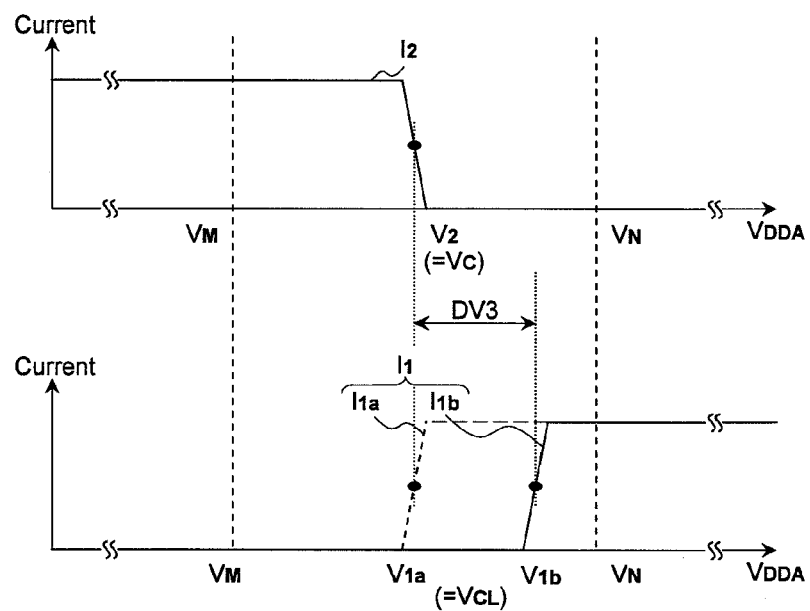
FIG. 12 is a diagram showing the dependencies of the pull-up current flowing through the pull-up MOS transistor of the contact type series regulator, and the pull-down current flowing through the pull-down MOS transistor of the noncontact type shunt regulator on the voltage of the inside source line in the power-supply circuit shown in FIG. 11.

The control section (B4, B7) can control the first voltage divider (B5) of the shunt regulator (B2) according to a result of detection of the supply of the source voltage thereby to control the voltage level of the first set voltage (V1) into a level higher than the voltage level of the second set voltage (V2) (see FIGS. 11 and 12).

According to a more preferred embodiment, the control section (B4, B7) is arranged to be able to detect supply of the radio frequency signal to the pair of antenna terminals (LA, LB), and to detect supply of the source voltage to the source-voltage terminal ($V_{DD}$).

The control section (B4, B7) can control the second voltage divider (B6) of the series regulator (B3) according to a result of detection of the supply of the radio frequency signal thereby to control the voltage level of the second set voltage (V2) into a level lower than the voltage level of the first set voltage (V1).

Figure 14:
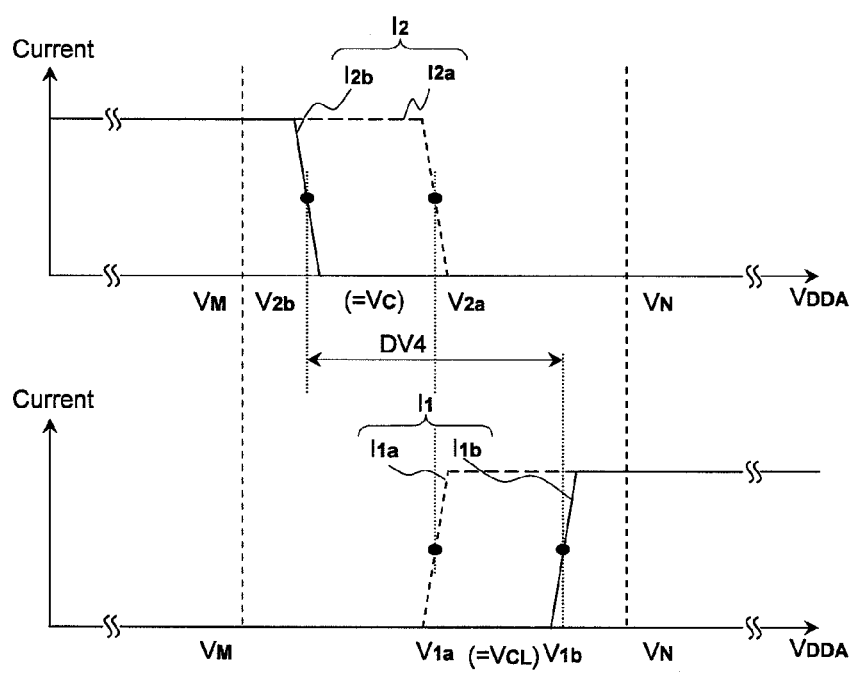
FIG. 14 is a diagram showing the dependencies of the pull-up current flowing through the pull-up MOS transistor of the contact type series regulator, and the pull-down current flowing through the pull-down MOS transistor of the noncontact type shunt regulator on the voltage of the inside source line in the power-supply circuit shown in FIG. 13.

The control section (B4, B7) can control the first voltage divider (B5) of the shunt regulator (B2) according to a result of detection of the supply of the source voltage thereby to control the voltage level of the first set voltage (V1) into a level higher than the voltage level of the second set voltage (V2) (FIGS. 13 and 14).

According to a still more preferred embodiment, the pull-down transistor (M1) is an N-channel MOS transistor, and the pull-up transistor (M2) is a P-channel MOS transistor (see FIG. 13).

[3] A noncontact/contact electronic device (U1, U15) according to a preferred embodiment of the invention includes: an antenna (L1); a contact terminal (U10) for supply of a source voltage from outside; and a semiconductor integrated circuit (U2), which are incorporated in the electronic device.

The semiconductor integrated circuit (U2) is identical to the semiconductor integrated circuit described in [1] and [2].

[4] A mobile terminal device (U12) according to a preferred embodiment of the invention includes: a data-processing circuit operable to handle data; a data input device operable to accept input of the data to be handled by the data-processing circuit; and a display device operable to display the data to be handled by the data-processing circuit.

The mobile terminal device is arranged so as to hold the noncontact/contact electronic device (U1, U15) stated in [3].

2. Further Detailed Description of the Preferred Embodiments

Next, the embodiments will be described further in detail. It is noted that as to all the drawings to which reference is made in describing the best forms for carrying out the invention, the parts or components having identical functions are identified by the same reference numeral or character, and the repeated description thereof is omitted here.

First Embodiment

<<Configuration of Non-Contact Electronic Device with a Semiconductor Integrated Circuit>>

FIG. 1 is a diagram showing a configuration of the non-contact electronic device U1 having therein a semiconductor integrated circuit U2 according to the first embodiment of the invention.

As shown in FIG. 1, the noncontact electronic device U1 includes an antenna L1, a capacitance C1, a semiconductor integrated circuit U2, and an external contact terminal U10. Now, it is noted that the resonator circuit constituted by the antenna L1 and capacitance C1 connected in parallel resonates at an RF frequency of electromagnetic waves from a reader/writer. The resonance capacitance C1 is adjusted in consideration of factors including the parasitic capacitance of the antenna L1, and therefore it doesn't need connecting in the resonator circuit necessarily.

The semiconductor integrated circuit U2 has a power-supply circuit U3, an internal circuit U4, a pair of antenna terminals LA and LB for connecting the antenna L1, a source-voltage terminal $V_{DD}$ connected with the external contact terminal U10, a ground terminal $V_{SS}$, and a set of signal-input/output terminals PIO. Incidentally, a source voltage applied between the source-voltage terminal $V_{DD}$ and ground terminal $V_{SS}$ of the external contact terminal U10 may be supplied by a battery loaded in a mobile terminal device, such as a mobile phone.

Figure 2:
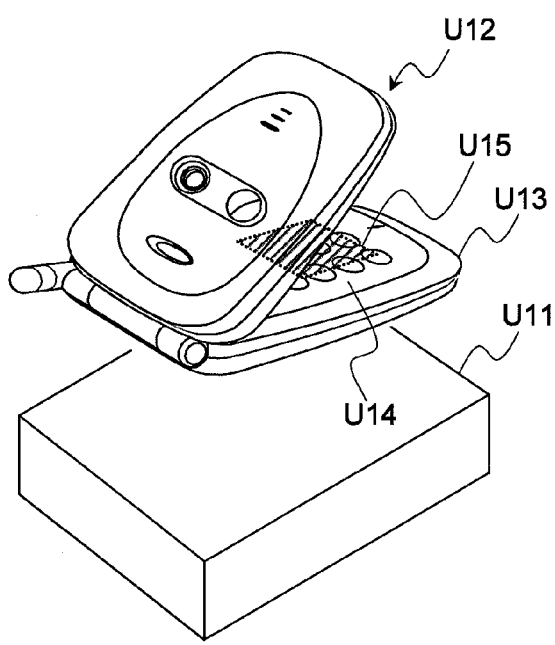
FIG. 2 is a diagram showing a mobile phone and a reader/writer, in which the mobile phone includes the noncontact electronic device having therein a semiconductor integrated circuit according to an embodiment of the invention.

FIG. 2 is a diagram showing a mobile phone U12 and a reader/writer U11, in which the mobile phone U12 includes the noncontact electronic device U1 having therein the semiconductor integrated circuit U2 according to the embodiment of the invention. The mobile phone U12 shown here as an example of the mobile terminal device has a collapsible housing. However, the housing is not particularly limited in its shape and function. Such mobile terminal device may be e.g. a portable music player.

As shown in FIG. 2, the mobile phone U12, which is a mobile terminal device, includes a collapsible housing U13, an input device U14 disposed on an inside front face of the main body of the housing U13 and used for inputting data, and a noncontact electronic device U15 located inside the housing U13 and disposed on e.g. the rear side of the input device U14. A liquid crystal display device (LCD) is arranged in the inner face of the cover of the housing U13, however it is not shown in FIG. 2. Further, a transmitter/receiver circuit for voice and/or data communication, and a data-processing circuit are placed inside the housing U13. Therefore, the liquid crystal display device (LCD) displays e.g. data input to and output from the data-processing circuit. Now, it is noted that the noncontact electronic device U15 may be incorporated in the mobile phone U12 so that it can be removed.

The noncontact electronic device U15 shown in FIG. 2 is identical to the noncontact electronic device U1 shown in FIG. 1, which includes the semiconductor integrated circuit U2, the antenna L1, the capacitance C1, and a set of metallic terminals forming the external contact terminal U10. The antenna L1 which receives electromagnetic waves from the reader/writer U11 exchanging data with the noncontact electronic device U15 is composed of a voluted coil formed by a trace or the like on a printed wiring board. The contact terminal U10 for external connection is formed by a set of metallic terminals on a surface of the noncontact electronic device U1. The noncontact electronic device U1 shown in FIG. 1 has the external contact terminal U10 connected with the source-voltage terminal $V_{DD}$, ground terminal $V_{SS}$, and signal-input/output terminal PIO of the semiconductor integrated circuit U2, and is connected with e.g. a data-processing circuit included in a mobile terminal device through these terminals. According to the arrangement like this, data of an internal circuit of the noncontact electronic device U15 can be displayed on the liquid crystal display device (LCD) by operating the input device U14.

Although no special restriction is intended, the semiconductor integrated circuit U2 is formed on a semiconductor substrate like a bulk of monocrystalline silicon by a well-known semiconductor IC manufacturing technique.

When put near the reader/writer U11, the mobile terminal device U12 with the noncontact electronic device U15 mounted therein performs data exchange with the reader/writer U11 regardless of whether or not the mobile phone U12 is powered up. On receipt of an electromagnetic wave from the reader/writer U11, the antenna L1 outputs AC signal of RF frequency between the paired antenna terminals LA and LB, provided that at the time, the AC signal of RF frequency has been partially modulated with information signals (data). Now, it is noted that AC stands for "alternating current".

<<Configuration and Action of the Power-Supply Circuit>>

The power-supply circuit U3 included in the semiconductor integrated circuit U2 shown in FIG. 1 has a rectifier B1, a noncontact type shunt regulator B2, a contact type series regulator B3, and a detector B4. According to a preferred embodiment of the invention, a smoothing capacitance is connected to output terminals of the rectifier 31 of the power-supply circuit U3, which restricts the fluctuation of the output voltage thereof caused by RF signals.

The power-supply circuit U3 has the function as described below.

In a case where RF signals are supplied to the pair of antenna terminals LA and LB with no source voltage supplied through the source-voltage terminal $V_{DD}$, the noncontact type shunt regulator 32 supplies the inside source line $V_{DDA}$ with a voltage produced from the RF signals supplied through the pair of antenna terminals LA and LB and limited in level. In contrast, in a case where no RF signal is supplied to the pair of antenna terminals LA and LB with a source voltage supplied through the source-voltage terminal $V_{DD}$, the contact type series regulator B3 supplies the inside source line $V_{DDA}$ with a voltage produced by restricting the source voltage provided through the source-voltage terminal $V_{DD}$ to a predetermined voltage level. Further, in a case where RF signals are supplied to the pair of antenna terminals LA and LB while a source voltage is fed through the source-voltage terminal $V_{DD}$, a stable source voltage for permitting the internal circuit U4 to work is produced from both the source voltage provided through the source-voltage terminal $V_{DD}$, and the voltage produced from the RF signals supplied through the pair of antenna terminals LA and LB. In this operation, both the noncontact type shunt regulator B2 and the contact type regulator B3 work. In a case where the power supplied through the pair of antenna terminals LA and LB is smaller than the source voltage supplied through the source-voltage terminal $V_{DD}$, the source voltage restricted by the contact type series regulator B3 in level is fed to the inside source line $V_{DDA}$. In a case where the power supplied through the pair of antenna terminals LA and LB is larger than the power supplied through the source-voltage terminal $V_{DD}$, the source voltage restricted by the noncontact type shunt regulator B2 in level is provided to the inside source line $V_{DDA}$.

The detector B4 has the function of detecting whether or not an RF signal is being supplied through the pair of antenna terminals LA and LB. Therefore, the detector B4 detects an RF signal supplied through the pair of antenna terminals LA and LB, and then produces a detection signal S1. The detection signal S1 is used for e.g. controlling the working conditions of the noncontact type shunt regulator B2 and contact type series regulator B3.

The internal circuit U4, which works using a voltage supplied through the inside source line $V_{DDA}$ as a source voltage, includes a receiver circuit U5, a transmitter circuit U6, a signal processor U7, a memory U8, and an I/O circuit U9. The receiver circuit U5 demodulates information signals superposed on AC signals received through the antenna L1 disposed for the noncontact electronic device U1, and supplies the signal processor U7 with digital information signals resulting from the demodulation. The transmitter circuit U6 modulates AC signals sent from the antenna L1 using information signals in response to digital information signals output by the signal processor U7. The reader/writer U11 receives information signals from the signal processor U7 in response to modulated electromagnetic waves coming from the antenna L1. The memory U8 is utilized to store information data transmitted from the reader/writer U11 to the signal processor U7, information data sent from the signal processor U7 to the reader/writer U11 and the like.

Also, the signal processor U7 can transfer a signal to an external device through the I/O circuit U9, signal-input/output terminal PIO, and contact terminal U10. When transferring a signal through the signal-input/output terminal PIO, the internal circuit U4 works using a source voltage fed through the source-voltage terminal $V_{DD}$ and ground terminal $V_{SS}$ of the contact terminal U10.

Further, even in a case where the source voltage is being supplied through the source-voltage terminal $V_{DD}$ and ground terminal $V_{SS}$ of the contact terminal U10, the internal circuit U4 can exchange an information signal with the reader/writer U11 utilizing the AC signal from the antenna L1.

<<Details of Configuration of the Power-Supply Circuit>>

FIG. 3 is a diagram showing details of a configuration of the power-supply circuit U3 included in the semiconductor integrated circuit U2 shown in FIG. 1.

As shown in FIG. 3, the power-supply circuit U3 includes the rectifier B1, noncontact type shunt regulator B2, contact type series regulator B3, and detector B4.

The rectifier B1 rectifies an RF signal supplied to the pair of antenna terminals LA and LB, and outputs a DC voltage decided in level relative to the ground potential $V_{SS}$ to the inside source line $V_{DDA}$.

The noncontact type shunt regulator B2 is connected to the inside source line $V_{DDA}$, and includes a voltage divider B5, an operational amplifier A1, and a pull-down MOS transistor M1. Incidentally, the pull-down MOS transistor M1 is an N-channel MOS transistor. The voltage divider B5 is connected between the inside source line $V_{DDA}$ and ground terminal $V_{SS}$, and includes voltage-dividing resistances R1 and R2. A divided voltage arising at the node between the voltage-dividing resistances R1 and R2 is supplied to a non-inverting input terminal (+) of the operational amplifier A1. In addition, a reference voltage source $V_{R1}$ is connected between the inverting input terminal (−) of the operational amplifier A1 and the ground terminal $V_{SS}$. The operational amplifier A1 supplies a gate terminal of the pull-down MOS transistor M1 with an output voltage depending on the potential difference between the non-inverting input terminal (+) and inverting input terminal (−).

With the configuration as described above, the noncontact type shunt regulator B2 controls the pull-down current I1 going through the pull-down MOS transistor M1 according to the voltage of the inside source line $V_{DDA}$, whereby a rise of the voltage of the inside source line $V_{DDA}$ is restricted so as not to exceed a predetermined upper-limit restriction level $V_{CL}$. Specifically, when an excessive power is supplied through the pair of antenna terminals LA and LB, a negative feedback is executed so that the rise of voltage of the inside source line $V_{DDA}$ never exceeds the predetermined upper-limit restriction level $V_{CL}$, in which the power is consumed by the pull-down current I1 going through the pull-down MOS transistor M1. The upper-limit restriction level $V_{CL}$ is set according to the following expression:

$$V_{CL}=V_{DDA}(\max)=V_{R1}\cdot(R1+R2)/R2.$$

On the other hand, the source voltage supplied through the source-voltage terminal $V_{DD}$ and ground terminal $V_{SS}$ of the contact terminal U10 is provided to the inside source line $V_{DDA}$ through the contact type series regulator B3.

The contact type series regulator B3 includes a voltage divider B6, an operational amplifier A2, and a pull-up MOS transistor M2. Incidentally, the pull-up MOS transistor M2 is a P-channel MOS transistor. The voltage divider B6 is connected between the inside source line $V_{DDA}$ and ground terminal $V_{SS}$, and includes voltage-dividing resistances R3 and R4. A divided voltage arising at the node between the voltage-dividing resistances R3 and R4 is supplied to a non-inverting input terminal (+) of the operational amplifier A2. In addition, a reference voltage source $V_{R2}$ is connected between the inverting input terminal (−) of the operational amplifier A2 and the ground terminal $V_{SS}$. The operational amplifier A2 supplies a gate terminal of the pull-up MOS transistor M2 with an output voltage depending on the potential difference between the non-inverting input terminal (+) and inverting input terminal (−).

With the configuration as described above, the contact type series regulator B3 controls the pull-up current I2 going through the pull-up MOS transistor M2 according to the voltage of the inside source line $V_{DDA}$, whereby the voltage of the inside source line $V_{DDA}$ is restricted so as not to exceed a predetermined upper-limit restriction level $V_C$. Specifically, in a case where the voltage of the inside source line $V_{DDA}$ is higher, the contact type series regulator B3 reduces the pull-up current I2 flowing through the pull-up MOS transistor M2, whereby a negative feedback is executed so that the voltage of the inside source line $V_{DDA}$ never exceeds the predetermined upper-limit restriction level $V_C$. The upper-limit restriction level $V_C$ is set according to the following expression:

$$V_C = V_{DDA}(\text{mini}) = V_{R2} \cdot (R3+R4)/R4.$$

The detector B4 has the function of detecting whether or not an RF signal is being supplied through the pair of antenna terminals LA and LB. Therefore, the detector B4 detects an RF signal supplied through the pair of antenna terminals LA and LB, and then produces a detection signal S1.

In the power-supply circuit U3 shown in FIG. 3, the noncontact type shunt regulator B2 is controlled by the detection signal S1 output by the detector B4. Specifically, the noncontact type shunt regulator B2 is controlled so that it starts working on acceptance of supply of RF signals through the pair of antenna terminals LA and LB.

Figure 4:
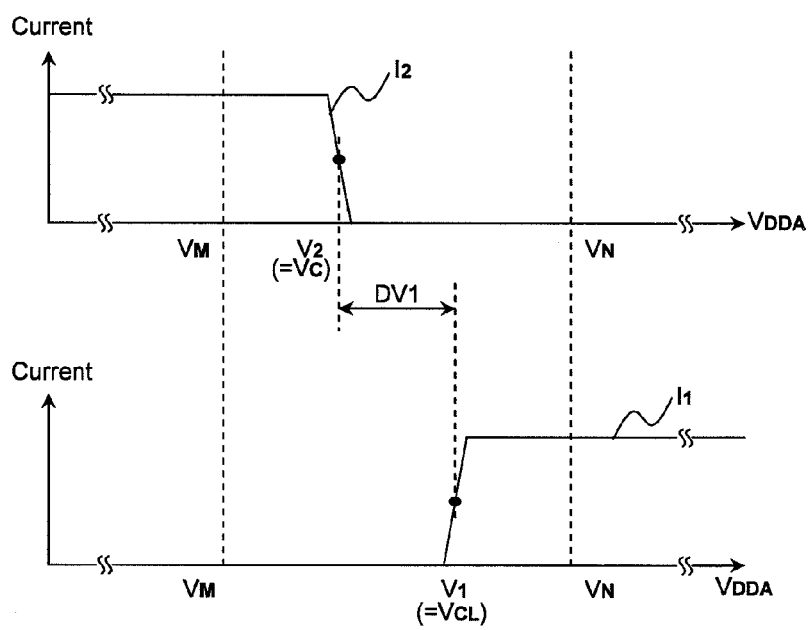
FIG. 4 is a diagram showing the dependencies of a pull-up current running through a pull-up MOS transistor of a contact type series regulator, and a pull-down current flowing through a pull-down MOS transistor of a noncontact type shunt regulator on the voltage of an inside source line in the power-supply circuit shown in FIG. 3.

FIG. 4 is a diagram showing the dependencies of the pull-up current I2 flowing through the pull-up MOS transistor M2 of the contact type series regulator B3 and the pull-down current I1 flowing through the pull-down MOS transistor M1 of the noncontact type shunt regulator B2 on the voltage of the inside source line $V_{DDA}$ in the power-supply circuit U3 shown in FIG. 3.

In response to a rise of the voltage of the inside source line $V_{DDA}$ to or above the first set voltage level V1 after the upper-limit restriction level $V_{CL}$ of the noncontact type shunt regulator B2 has been set to the first set voltage level V1, a large pull-down current I1 is passed through the pull-down MOS transistor M1. Therefore, the noncontact type shunt regulator B2 conducts a negative feedback so as to restrict the rise in the voltage of the inside source line $V_{DDA}$ to the first set voltage level V1, which is the upper-limit restriction level $V_{CL}$.

Further, in response to a fall of the voltage of the inside source line $V_{DDA}$ to or below the second set voltage level V2 after the upper-limit restriction level $V_C$ of the contact type series regulator B3 has been set to the second set voltage level V2, a large pull-up current I2 is passed through the pull-up MOS transistor M2. Therefore, the contact type series regulator B3 executes a negative feedback so as to restrict the drop in the voltage of the inside source line $V_{DDA}$ to the second set voltage level V2, which is the upper-limit restriction level $V_C$.

In the steps of setting the upper-limit restriction levels $V_{CL}$ and $V_C$, the first and second set voltage levels V1 and V2, namely the upper-limit restriction levels $V_{CL}$ and $V_C$ are set to voltage values higher than the minimum working voltage $V_M$ of the internal circuit U4 which works using a source voltage supplied to the inside source line $V_{DDA}$, and lower than the breakdown voltage $V_N$ of an elemental device included in the internal circuit U4 which works using a source voltage supplied to the inside source line $V_{DDA}$.

Further, the first set voltage level V1, i.e. the upper-limit restriction level $V_{CL}$, is set to be higher than the second set voltage level V2, i.e. the upper-limit restriction level $V_C$. As a result, a large pull-down current I1 going through the pull-down MOS transistor M1 of the noncontact type shunt regulator B2, and a large pull-up current I2 going through the pull-up MOS transistor M2 of the contact type series regulator B3 are prevented from being caused concurrently in response to source voltages of an identical level supplied to the inside source line $V_{DDA}$. If such two large currents are caused at a time, an electric power will be consumed wastefully. For that reason, the first set voltage level V1, i.e. the upper-limit restriction level $V_{CL}$ is set to be higher than the second set voltage level V2, i.e. the upper-limit restriction level $V_C$ by a predetermined voltage difference DV1 taking into account the manufacturing variation of the semiconductor integrated circuit U2.

By making the setting as described above, the pull-up MOS transistor M2 is controlled so as not to accept passing of the pull-up current I2 in case that the pull-down current is being passed through the pull-down MOS transistor M1. Therefore, when an RF power sufficient for the internal circuit U4 to work is being supplied through the pair of antenna terminals LA and LB, the consumption of current flowing into the power-supply circuit through the source-voltage terminal $V_{DD}$ of the contact terminal U10 can be cut.

Second Embodiment

<<Details of Another Configuration of the Power-Supply Circuit>>

FIG. 5 is a diagram showing details of another configuration of the power-supply circuit U3 included in the semiconductor integrated circuit U2 shown in FIG. 1 according to the second embodiment of the invention.

The power-supply circuit U3 shown in FIG. 5 has a controller B7 in addition to a rectifier B1, a noncontact type shunt regulator B2, a contact type series regulator B3, and a detector B4, which are identical to those included in the power-supply circuit U3 shown in FIG. 3.

Also, in regard to the power-supply circuit U3 shown in FIG. 5, the detector B4 has the function of detecting whether or not an RF signal is supplied through the pair of antenna terminals LA and LB. Therefore, the detector B4 detects an RF signal supplied through the pair of antenna terminals LA and LB, and then produces a detection signal S1. The controller B7 shown in FIG. 5, which is added to the power-supply circuit U3, generates a control signal S2 in response to a detection signal S1 produced by the detector B4. According to the control signal S2 produced by the controller B7, the resistance ratio of the voltage-dividing resistances R3 and R4 of the voltage divider B6 included in the contact type series regulator B3 is controlled variably.

In the power-supply circuit U3 shown in FIG. 5, the noncontact type shunt regulator B2 is controlled by the detection signal S1 output by the detector B4. Specifically, the noncontact type shunt regulator B2 is controlled so that it starts working on acceptance of supply of RF signals through the pair of antenna terminals LA and LB. At this time, the controller B7 generates a control signal S2 in response to a detection signal S1 produced by the detector B4. According to the control signal S2 generated by the controller B7, the resistance ratio R3/R4 of the voltage-dividing resistances R3 and R4 is changed from a large value to a small one in the voltage divider B6 included in the contact type series regulator B3. The upper-limit restriction level $V_C$ of the contact type series regulator B3 at this point is set to a small value according to the following expression:

$$V_C = V_{DDA}(\text{mini}) = V_{R2} \cdot (R3+R4)/R4.$$

In contrast, under the condition that no RF signal is supplied through the pair of antenna terminals LA and LB, the noncontact type shunt regulator B2 is controlled into its non-working condition according to the detection signal S1 from the detector B4. At this time, according to the control signal S2 produced by the controller B7, the resistance ratio R3/R4 of the voltage-dividing resistances R3 and R4 is changed from a small value to a large one in the voltage divider B6 included in the contact type series regulator B3. The upper-limit restriction level $V_C$ of the contact type series regulator B3 at this point is set to a large value according to the following expression:

$$V_C = V_{DDA}(\text{mini}) = V_{R2} \cdot (R3+R4)/R4.$$

In this way, the second set voltage level V2, which is the upper-limit restriction level $V_C$ of the contact type series regulator B3, is controlled variably. Other parts of the configuration of the power-supply circuit U3 shown in FIG. 5 are the same as those of the power-supply circuit U3 shown in FIG. 3.

FIG. 6 is a diagram showing the dependencies of the pull-up current I2 flowing through the pull-up MOS transistor M2 of the contact type series regulator B3, and the pull-down current I1 flowing through the pull-down MOS transistor M1 of the noncontact type shunt regulator B2 on the voltage of the inside source line $V_{DDA}$ in the power-supply circuit U3 shown in FIG. 5.

The lower portion of FIG. 6 shows the dependency of the pull-down current I1 of the pull-down MOS transistor M1 of the noncontact type shunt regulator B2 of the power-supply circuit U3 of FIG. 5 on the voltage of the inside source line $V_{DDA}$. The dependency shown in the lower portion of FIG. 6 is exactly the same as the dependency of the pull-down current I1 of the pull-down MOS transistor M1 of the noncontact type shunt regulator B2 of the power-supply circuit U3 of FIG. 3 on the voltage of the inside source line $V_{DDA}$, which is shown in the lower portion of FIG. 4.

The upper portion of FIG. 6 shows the dependency of the pull-up current I2 flowing through the pull-up MOS transistor M2 of the contact type series regulator B3 of the power-supply circuit U3 of FIG. 5 on the voltage of the inside source line $V_{DDA}$.

The broken line I2a in the upper portion of FIG. 6 shows the dependency of the pull-up current I2 flowing through the pull-up MOS transistor M2 of the contact type series regulator B3 on the voltage of the inside source line $V_{DDA}$ in a case where the noncontact type shunt regulator B2 is controlled into the non-working condition according to the detection signal S1 from the detector B4 under the condition that no RF signal is being supplied through the pair of antenna terminals LA and LB. In this case, the resistance ratio R3/R4 of the voltage-dividing resistances R3 and R4 in the voltage divider B6 is set to a large value according to the control signal S2 produced by the controller B7. Further, the upper-limit restriction level $V_C$ of the contact type series regulator B3 in this case is set to a large value according to the following expression:

$$V_C = V_{DDA}(\text{mini}) = V_{R2} \cdot (R3+R4)/R4.$$

Thus, the second set voltage level V2a, which is the upper-limit restriction level $V_C$ of the contact type series regulator B3, is set to a large value. For example, the second set voltage level V2a set to a large value is substantially the same as the first set voltage level V1, which is the upper-limit restriction level $V_{CL}$ of the noncontact type shunt regulator B2.

On the other hand, the solid line I2b in the upper portion of FIG. 6 shows the dependency of the pull-up current I2 flowing through the pull-up MOS transistor M2 of the contact type series regulator B3 on the voltage of the inside source line $V_{DDA}$ in a case where the noncontact type shunt regulator B2 is controlled into the working condition according to the detection signal S1 from the detector B4 under the condition that an RF signal is being supplied through the pair of antenna terminals LA and LB. In this case, the resistance ratio R3/R4 of the voltage-dividing resistances R3 and R4 in the voltage divider B6 is set to a small value according to the control signal S2 produced by the controller B7. Further, the upper-limit restriction level $V_C$ of the contact type series regulator B3 in this case is set to a small value according to the following expression:

$$V_C = V_{DDA}(\text{mini}) = V_{R2} \cdot (R3+R4)/R4.$$

Thus, the second set voltage level V2b, which is the upper-limit restriction level $V_C$ of the contact type series regulator B3, is set to a small value. For example, the second set voltage level V2b set to a small value is lower than the first set voltage level V1, which is the upper-limit restriction level $V_{CL}$ of the noncontact type shunt regulator B2.

As a result, a large pull-down current I1 going through the pull-down MOS transistor M1 of the noncontact type shunt regulator B2, and a large pull-up current I2 going through the pull-up MOS transistor M2 of the contact type series regulator B3 are prevented from being caused concurrently in response to source voltages of identical levels supplied to the inside source line $V_{DDA}$. If such two large currents are caused at a time, an electric power will be consumed wastefully. For that reason, the first set voltage level V1, i.e. the upper-limit restriction level $V_{CL}$ is set to be higher than the second set voltage level V2b, i.e. the upper-limit restriction level $V_C$ by a predetermined voltage difference DV2 taking into account the manufacturing variation of the semiconductor integrated circuit U2.

By making the setting as described above, the pull-up MOS transistor M2 is controlled so as not to accept passing of the pull-up current I2 in case that the pull-down current is being passed through the pull-down MOS transistor M1. Therefore, when an RF power sufficient for the internal circuit U4 to work is being supplied through the pair of antenna terminals LA and LB, the consumption of current flowing into the power-supply circuit through the source-voltage terminal $V_{DD}$ of the contact terminal U10 can be cut.

In the steps of setting the upper-limit restriction levels $V_{CL}$ and $V_C$, the first set voltage level V1 for the upper-limit restriction level $V_{CL}$, and the second set voltage levels V2a and V2b for the upper-limit restriction level $V_C$ are set to voltage values higher than the minimum working voltage $V_M$ of the internal circuit U4 which works using a source voltage supplied to the inside source line $V_{DDA}$, and lower than the breakdown voltage $V_N$ of an elemental device included in the internal circuit U4 which works using a source voltage supplied to the inside source line $V_{DDA}$.

<<Voltage Divider of the Contact Type Series Regulator>>

Figure 7:
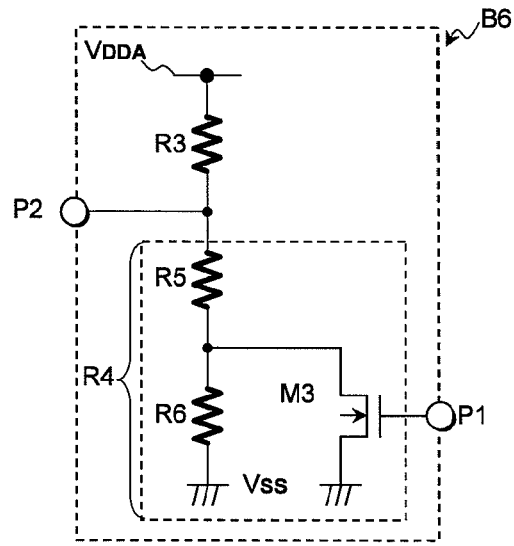
FIG. 7 is a diagram specifically showing a configuration of a voltage divider included in the contact type series regulator of the power-supply circuit shown in FIG. 5.

FIG. 7 is a diagram specifically showing a configuration of the voltage divider B6 included in the contact type series regulator B3 of the power-supply circuit U3 shown in FIG. 5.

As already shown in FIG. 5, the voltage divider B6 shown in FIG. 7 includes voltage-dividing resistances R3 and R4. However, in the voltage divider B6, the voltage-dividing resistance R4 is constituted by two series resistances R5 and R6 and an N-channel MOS transistor M3 as shown in FIG. 7.

The voltage divider B6 shown in FIG. 7 is arranged as follows. That is, one end of the voltage-dividing resistance R3 is connected to the inside source line $V_{DDA}$, and the other end of the voltage-dividing resistance R3 is connected with a divided-voltage output terminal P2 and one end of the first series resistance R5 of the voltage-dividing resistance R4. The other end of the first series resistance R5 of the voltage-dividing resistance R4 is connected with one end of the second series resistance R6 of the voltage-dividing resistance R4, and a drain of the N-channel MOS transistor M3. The other end of the series resistance R6, and a source of the N-channel MOS transistor M3 are connected to the ground terminal $V_{SS}$. A gate of the N-channel MOS transistor M3 is controlled according to a control signal supplied through an input terminal P1.

Therefore, under the condition that no RF signal is supplied through the pair of antenna terminals LA and LB, the noncontact type shunt regulator B2 is controlled into the non-working condition according to the detection signal S1 from the detector B4; in case that the resistance ratio R3/R4 of the voltage-dividing resistances R3 and R4 in the voltage divider B6 is set to a large value according to the control signal S2 produced by the controller B7, the control signal supplied to the input terminal P1 is made High level. Consequently, the N-channel MOS transistor M3 is controlled to be turned ON. If the on-resistance of the MOS transistor is ignored, the resistance value of the voltage-dividing resistance R4 is provided by only the first series resistance R5 of the two series resistances R5 and R6.

In contrast, under the condition that an RF signal is supplied through the pair of antenna terminals LA and LB, the noncontact type shunt regulator B2 is controlled into the working condition according to the detection signal S1 from the detector B4; in case that the resistance ratio R3/R4 of the voltage-dividing resistances R3 and R4 in the voltage divider B6 is set to a small value according to the control signal S2 produced by the controller B7, the control signal supplied to the input terminal P1 is made Low level. Consequently, the N-channel MOS transistor M3 is controlled to be turned OFF, and the resistance value of the voltage-dividing resistance R4 becomes equal to the sum of the values of the two series resistances R5 and R6.

<<Operation Waveforms of the Semiconductor Integrated Circuit>>

Figure 8:
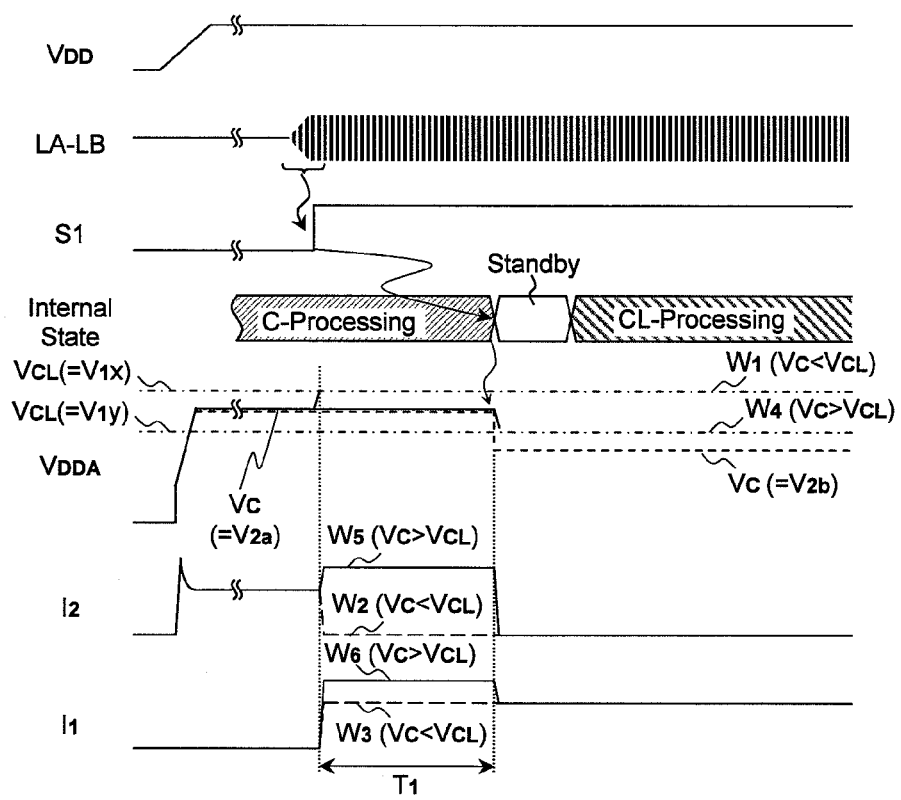
FIG. 8 is a diagram showing operation waveforms of the semiconductor integrated circuit shown in FIG. 1, which includes the power-supply circuit according to the second embodiment of the invention shown in FIG. 5.

FIG. 8 is a diagram showing operation waveforms of the semiconductor integrated circuit U2 shown in FIG. 1, which includes the power-supply circuit U3 according to the second embodiment of the invention shown in FIG. 5.

Shown in the drawing are operation waveforms and conditions at the individual points in case that an RF signal power is supplied through the pair of antenna terminals LA and LB after the source voltage has been supplied through the source-voltage terminal $V_{DD}$ of the contact terminal U10. Particularly, the controller B7 of the power-supply circuit U3 shown in FIG. 5 is supplied with the detection signal S1 produced by the detector B4, and with the control signal S3 showing whether or not the internal circuit U4 of the semiconductor integrated circuit U2 shown in FIG. 1 is in the course of signal processing. Therefore, the upper-limit restriction level $V_C$ (V2a, V2b) of the contact type series regulator B3 of the power-supply circuit U3 shown in FIG. 5 is controlled according to the control signal S2 produced by the controller B7 in response to the detection signal S1 and control signal S3.

As shown in FIG. 8, when the source voltage is supplied through the source-voltage terminal $V_{DD}$ of the contact terminal U10, a voltage which is restricted by the contact type series regulator B3 is supplied to the inside source line $V_{DDA}$. At this time, the upper-limit restriction level $V_C$ of the contact type series regulator B3 is controlled to be the second set voltage level V2a for higher level.

After that, when an RF signal power is supplied through the pair of antenna terminals LA and LB, the detector B4 detects the power supply, and inverts the detection signal S1 in polarity. Then, the noncontact type shunt regulator B2 starts working.

Meanwhile, the upper-limit restriction level $V_{CL}$ of the noncontact type shunt regulator B2 should be controlled to coincide with the first set voltage level V1 ideally. However, with regard to the first set voltage level V1, there are fluctuations in the first set voltage level V1x for higher level and the first set voltage level V1y for lower level under the influence of an error of a semiconductor device and other factors in the example shown with reference to FIG. 8. Examples of operation waveforms of the inside source line $V_{DDA}$, the pull-down current I1 passing through the pull-down MOS transistor M1, and the pull-up current I2 running through the pull-up MOS transistor M2 in a case where the first set voltage level V1 as the upper-limit restriction level $V_{CL}$ of the noncontact type shunt regulator B2 involves such fluctuations are shown in FIG. 8.

In the drawing, W1 denotes the voltage waveform of the inside source line $V_{DDA}$, W2 denotes the current waveform of the pull-up current I2 running through the pull-up MOS transistor M2, and W3 denotes the current waveform of the pull-down current I1 flowing through the pull-down MOS transistor M1, provided that the waveforms are examples in a case where the upper-limit restriction level $V_{CL}$ of the noncontact type shunt regulator B2 is set to a voltage level V1x higher than the upper-limit restriction level $V_C$ (=V2a) of the contact type series regulator B3.

Further, W4 denotes the voltage waveform of the inside source line $V_{DDA}$, W5 denotes the current waveform of the pull-up current I2 flowing through the pull-up MOS transistor M2, and W6 denotes the current waveform of the pull-down current I1 running through the pull-down MOS transistor M1, provided that the waveforms are examples in a case where the upper-limit restriction level $V_{CL}$ of the noncontact type shunt regulator B2 is set to a voltage level V1y lower than the upper-limit restriction level $V_C$ (=V2a) of the contact type series regulator B3.

In a case where the upper-limit restriction level $V_{CL}$ of the noncontact type shunt regulator B2 is set to a voltage level V1x higher than the upper-limit restriction level $V_C$ (=V2a) of the contact type series regulator B3, the semiconductor integrated circuit works as described below.

As is clear from FIG. 8, a source voltage is supplied through the source-voltage terminal $V_{DD}$ of the contact terminal U10 first. Then, the contact type series regulator B3 starts working, and a relatively large pull-up current I2 is passed through the pull-up MOS transistor M2 of the contact type series regulator B3. However, initially no RF signal power is fed through the pair of antenna terminals LA and LB, and the operation of the noncontact type shunt regulator B2 has been left stopped by the detection signal S1 output by the detector B4. Therefore, the pull-down current I1 of the pull-down MOS transistor M1 of the noncontact type shunt regulator B2 remains shut off. Upon the start of the action of the contact type series regulator B3, the voltage level of the inside source line $V_{DDA}$ is set to the upper-limit restriction level $V_C$ (=V2a) of the contact type series regulator B3.

After that, the RF signal power supply through the pair of antenna terminals LA and LB is started, and then the detection signal S1 output by the detector B4 starts the noncontact type shunt regulator B2 working. By starting the operation of the noncontact type shunt regulator B2 in this way, a relatively large pull-down current I1 is passed through the pull-down MOS transistor M1 of the noncontact type shunt regulator B2. In addition, as a result of start of the operation of the noncontact type shunt regulator B2, an attempt to set the voltage level of the inside source line $V_{DDA}$ to the upper-limit restriction level $V_{CL}$ (=V1x) of the noncontact type shunt regulator B2 is made. However, at this point, the contact type series regulator B3 has begun working, and an attempt to set the voltage level of the inside source line $V_{DDA}$ to the upper-limit restriction level $V_C$ (=V2a) of the contact type series regulator B3 is made. At this point, the upper-limit restriction level $V_C$ (=V2a) of the contact type series regulator B3 is lower than the upper-limit restriction level $V_{CL}$ (=V1x) of the noncontact type shunt regulator B2 and therefore, the voltage level of the inside source line $V_{DDA}$ is set to the upper-limit restriction level $V_{CL}$ (=V1x) of the higher level of the noncontact type shunt regulator B2. By setting the upper-limit restriction level $V_{CL}$ (=V1x) of the higher level of the noncontact type shunt regulator B2 for the voltage level of the inside source line $V_{DDA}$, the pull-up current I2 of the pull-up MOS transistor M2 of the contact type series regulator B3 is put in the cutoff state.

After that, the control signal S2 output by the controller B7 changes the upper-limit restriction level $V_C$ of the contact type series regulator B3 from the high voltage level V2a to the low voltage level V2b. Therefore, the pull-up current I2 of the pull-up MOS transistor M2 of the contact type series regulator B3 is left shut off. During this time, to keep the voltage level of the inside source line $V_{DDA}$ at the upper-limit restriction level $V_{CL}$ (=V1x) of the higher level, a relatively larger pull-down current I1 is passed through the pull-down MOS transistor M1 in the noncontact type shunt regulator B2.

In a case where the upper-limit restriction level $V_{CL}$ of the noncontact type shunt regulator B2 is set to a voltage level V1y lower than the upper-limit restriction level $V_C$ (=V2a) of the contact type series regulator B3, the semiconductor integrated circuit works as described below.

As is clear from FIG. 8, a source voltage is supplied through the source-voltage terminal $V_{DD}$ of the contact terminal U10 first. Then, the contact type series regulator B3 starts working, and a relatively large pull-up current I2 is passed through the pull-up MOS transistor M2 of the contact type series regulator B3. However, initially, no RF signal power is fed through the pair of antenna terminals LA and LB, and the operation of the noncontact type shunt regulator B2 is kept stopped by the detection signal S1 output by the detector B4. Therefore, the pull-down current I1 of the pull-down MOS transistor M1 of the noncontact type shunt regulator B2 remains shut off. Upon the start of the action of the contact type series regulator B3, the voltage level of the inside source line $V_{DDA}$ is set to the upper-limit restriction level $V_C$ (=V2a) of the contact type series regulator B3.

After that, the RF signal power supply through the pair of antenna terminals LA and LB is started, and then the detection signal S1 output by the detector B4 starts the noncontact type shunt regulator B2 working. By starting the operation of the noncontact type shunt regulator B2 in this way, a relatively large pull-down current I1 is passed through the pull-down MOS transistor M1 of the noncontact type shunt regulator B2. In addition, as a result of start of the operation of the noncontact type shunt regulator B2, an attempt to set the voltage level of the inside source line $V_{DDA}$ to the upper-limit restriction level $V_{CL}$ (=V1y) of the noncontact type shunt regulator B2 is made. However, at this point, the contact type series regulator B3 has begun working, and an attempt to set the voltage level of the inside source line $V_{DDA}$ to the upper-limit restriction level $V_C$ (=V2a) of the contact type series regulator B3 is made. At this point, the upper-limit restriction level $V_C$ (=V2a) of the contact type series regulator B3 is higher than the upper-limit restriction level $V_{CL}$ (=V1y) of the noncontact type shunt regulator B2 and therefore, the voltage level of the inside source line $V_{DDA}$ is set to the higher upper-limit restriction level $V_C$ (=V2a) of the contact type series regulator B3. During this, to keep the voltage level of the inside source line $V_{DDA}$ at the higher upper-limit restriction level $V_C$ (=V2a), a relatively larger pull-up current I2 is passed through the pull-up MOS transistor M2 in the contact type series regulator B3.

However, in this case, a relatively large pull-down current I1 is passed through the pull-down MOS transistor M1 of the noncontact type shunt regulator B2 and in parallel, a relatively large pull-up current I2 is passed through the pull-up MOS transistor M2 of the contact type series regulator B3. Thus, the action of the noncontact type shunt regulator B2 and the action of the contact type series regulator B3 compete against each other. In other words, as shown by the operation waveforms W4, W5 and W6 in the period T1 in FIG. 8, the pull-up current I2 and pull-down current I1 are caused to flow from the source-voltage terminal $V_{DD}$ to the ground terminal $V_{SS}$ and thus, a large volume of electric power is consumed.

Hence, the internal circuit U4 included in the semiconductor integrated circuit U2 shown in FIG. 1 is made to complete its action of signal processing (C-Processing), which the internal circuit U4 is executing using the signal-input/output terminal PIO, etc., while both the noncontact type shunt regulator B2 and the contact type series regulator B3 are left working. After the completion of the action, the internal circuit U4 is made to go into Standby, and concurrently the completion of the signal processing by the internal circuit U4 is notified to the controller B7 by use of the control signal S3. As a result, the control signal S2 produced by the controller B7 changes the upper-limit restriction level $V_C$ of the contact type series regulator B3 from the high voltage level V2a to the low voltage level V2b. In this way, the pull-up current I2 of the pull-up MOS transistor M2 of the contact type series regulator B3 is cut. During this, to keep the voltage level of the inside source line $V_{DDA}$ at the upper-limit restriction level $V_{CL}$ (=V1y) of the lower level, a relatively large pull-down current I1 is passed through the pull-down MOS transistor M1 in the noncontact type shunt regulator B2.

After that, using an RF signal supplied through the pair of antenna terminals LA and LB, the internal circuit U4 of the semiconductor integrated circuit U2 shown in FIG. 1 conducts data transfer with the reader/writer U11. In this action, the internal circuit U4 operates using a source voltage which is produced by the rectifier B1 and noncontact type shunt regulator B2, and supplied through the inside source line $V_{DDA}$. Therefore, regardless of whether or not a power source is supplied through the source-voltage terminal $V_{DD}$ of the contact terminal U10, it becomes possible to execute a stable operation as in the above-mentioned case, and the communication performance thereof is never deteriorated.

As described above, the upper-limit restriction level $V_C$ of the contact type series regulator B3 is changed from the high voltage level V2a to the low voltage level V2b using the detection signal S1 produced by the detector B4, and the control signal S3 depending on the working condition of the internal circuit U4. In this way, the competition time T1, during which the action of the noncontact type shunt regulator B2 with a large pull-down current I1 flowing therein and the action of the contact type series regulator B3 with a large pull-up current I2 flowing therein compete against each other, can be restricted to a shorter time. Further, by so changing the upper-limit restriction level $V_C$ of the contact type series regulator B3, the difference between the upper-limit restriction level $V_{CL}$ of the noncontact type shunt regulator B2, and the upper-limit restriction level $V_C$ (=V2$a$) of the contact type series regulator B3 can be made smaller. The difference in the performance of the internal circuit of the semiconductor integrated circuit U2 shown in FIG. 1, which is attributed to the difference in the source of supply of electric power to the inside source line $V_{DDA}$, can be made much smaller. Further, the need for remarkably lowering the upper-limit restriction level $V_C$ (=V2$a$) of the contact type series regulator B3 for the purpose of avoiding the competition between the noncontact type shunt regulator B2 and contact type series regulator B3 in operation in a situation where the internal circuit U4 is processing a signal is eliminated. Therefore, even in a case where the minimum working voltage $V_M$ of the internal circuit U4 is relatively high, a stable source voltage control can be achieved.

<<Other Operation Waveforms of the Semiconductor Integrated Circuit>>

Figure 9:
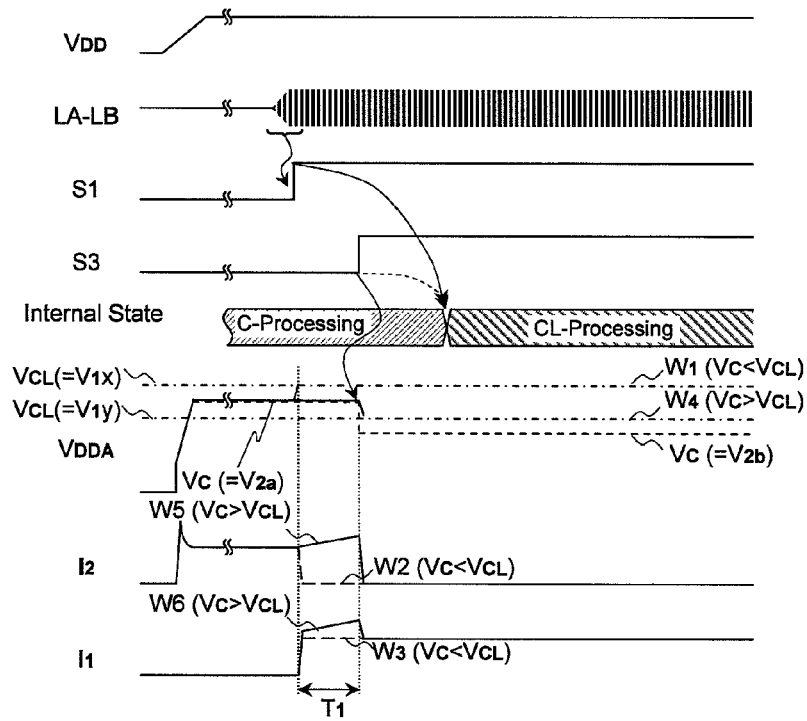
FIG. 9 is a diagram showing other operation waveforms of the semiconductor integrated circuit shown in FIG. 1, which includes the power-supply circuit according to the second embodiment of the invention shown in FIG. 5.

FIG. 9 is a diagram showing other operation waveforms of the semiconductor integrated circuit U2 shown in FIG. 1, which includes the power-supply circuit U3 according to the second embodiment of the invention shown in FIG. 5.

Shown in the drawing are operation waveforms and conditions at the individual points in case that an RF signal power is supplied through the pair of antenna terminals LA and LB after the source voltage has been supplied through the source-voltage terminal $V_{DD}$ of the contact terminal U10.

Particularly, the controller B7 of the power-supply circuit U3 shown in FIG. 5 is supplied with the detection signal S1 produced by the detector B4, and with the control signal S3 showing whether or not the power required for the internal circuit U4 of the semiconductor integrated circuit U2 shown in FIG. 1 to work is supplied through the pair of antenna terminals LA and LB. FIG. 9 is for showing the way the upper-limit restriction level $V_C$ (=V2$a$, V2$b$) of the contact type series regulator B3 is controlled according to the information of the detection signal S1 and control signal S3.

As shown in FIG. 9, when the source voltage is supplied through the source-voltage terminal $V_{DD}$ of the contact terminal U10, a voltage which is restricted by the contact type series regulator B3 is supplied to the inside source line $V_{DDA}$. At this time, the upper-limit restriction level $V_C$ of the contact type series regulator B3 is controlled to be the second set voltage level V2$a$ for higher level.

After that, when an RF signal power is supplied through the pair of antenna terminals LA and LB, the detector B4 detects the power supply, and inverts the detection signal S1 in polarity. Then, the noncontact type shunt regulator B2 starts working.

Meanwhile, the upper-limit restriction level $V_{CL}$ of the noncontact type shunt regulator B2 should be controlled to coincide with the first set voltage level V1 ideally. However, with regard to the first set voltage level V1, there are fluctuations in the first set voltage level V1$x$ for higher level and the first set voltage level V1$y$ for lower level under the influence of an error of a semiconductor device and other factors in the example shown with reference to FIG. 9. Examples of operation waveforms of the inside source line $V_{DDA}$, the pull-down current I1 passing through the pull-down MOS transistor M1, and the pull-up current I2 running through the pull-up MOS transistor M2 in a case where the first set voltage level V1 as the upper-limit restriction level $V_{CL}$ of the noncontact type shunt regulator B2 involves such fluctuations are shown in FIG. 9.

In the drawing, W1 denotes the voltage waveform of the inside source line $V_{DDA}$, W2 denotes the current waveform of the pull-up current I2 running through the pull-up MOS transistor M2, and W3 denotes the current waveform of the pull-down current I1 flowing through the pull-down MOS transistor M1, provided that the waveforms are examples in a case where the upper-limit restriction level $V_{CL}$ of the noncontact type shunt regulator B2 is set to a voltage level V1$x$ higher than the upper-limit restriction level $V_C$ (=V2$a$) of the contact type series regulator B3.

Further, W4 denotes the voltage waveform of the inside source line $V_{DDA}$, W5 denotes the current waveform of the pull-up current I2 flowing through the pull-up MOS transistor M2, and W6 denotes the current waveform of the pull-down current I1 running through the pull-down MOS transistor M1, provided that the waveforms are examples in a case where the upper-limit restriction level $V_{CL}$ of the noncontact type shunt regulator B2 is set to a voltage level V1$y$ lower than the upper-limit restriction level $V_C$ (=V2$a$) of the contact type series regulator B3.

In a case where the upper-limit restriction level $V_{CL}$ of the noncontact type shunt regulator B2 is set to a voltage level V1$x$ higher than the upper-limit restriction level $V_C$ (=V2$a$) of the contact type series regulator B3, the semiconductor integrated circuit works as described below.

As is clear from FIG. 9, a source voltage is supplied through the source-voltage terminal $V_{DD}$ of the contact terminal U10 first. Then, the contact type series regulator B3 starts working, and a relatively large pull-up current I2 is passed through the pull-up MOS transistor M2 of the contact type series regulator B3. However, initially no RF signal power is fed through the pair of antenna terminals LA and LB, and the operation of the noncontact type shunt regulator B2 has been left stopped by the detection signal S1 output by the detector B4. Therefore, the pull-down current I1 of the pull-down MOS transistor M1 of the noncontact type shunt regulator B2 remains shut off. Upon the start of the action of the contact type series regulator B3, the voltage level of the inside source line $V_{DDA}$ is set to the upper-limit restriction level $V_C$ (=V2$a$) of the contact type series regulator B3.

After that, the RF signal power supply through the pair of antenna terminals LA and LB is started, and then the detection signal S1 output by the detector B4 starts the noncontact type shunt regulator B2 working. By starting the operation of the noncontact type shunt regulator B2 in this way, a relatively large pull-down current I1 is passed through the pull-down MOS transistor M1 of the noncontact type shunt regulator B2. In addition, as a result of start of the operation of the noncontact type shunt regulator B2, an attempt to set the voltage level of the inside source line $V_{DDA}$ to the upper-limit restriction level $V_{CL}$ (=V1$x$) of the noncontact type shunt regulator B2 is made. However, at this point, the contact type series regulator B3 has begun working, and an attempt to set the voltage level of the inside source line $V_{DDA}$ to the upper-limit restriction level $V_C$ (=V2$a$) of the contact type series regulator B3 is made. At this point, the upper-limit restriction level $V_C$ (=V2$a$) of the contact type series regulator B3 is lower than the upper-limit restriction level $V_{CL}$ (=V1$x$) of the noncontact type shunt regulator B2 and therefore, the voltage level of the inside source line $V_{DDA}$ is set to the upper-limit restriction level $V_{CL}$ (=V1$x$) of the higher level of the noncontact type shunt regulator B2. By setting the upper-limit restriction level $V_{CL}$ (=V1x) of the higher level of the noncontact type shunt regulator B2 for the voltage level of the inside source line $V_{DDA}$, the pull-up current I2 of the pull-up MOS transistor M2 of the contact type series regulator B3 is put in the cutoff state.

After that, the control signal S2 output by the controller B7 changes the upper-limit restriction level $V_C$ of the contact type series regulator B3 from the high voltage level V2a to the low voltage level V2b. Therefore, the pull-up current I2 of the pull-up MOS transistor M2 of the contact type series regulator B3 is left shut off. During this time, to keep the voltage level of the inside source line $V_{DDA}$ at the upper-limit restriction level $V_{CL}$ (=V1x) of the higher level, a relatively larger pull-down current I1 is passed through the pull-down MOS transistor M1 in the noncontact type shunt regulator B2.

In a case where the upper-limit restriction level $V_{CL}$ of the noncontact type shunt regulator B2 is set to a voltage level V1y lower than the upper-limit restriction level $V_C$ (=V2a) of the contact type series regulator B3, the semiconductor integrated circuit works as described below.

As is clear from FIG. 9, a source voltage is supplied through the source-voltage terminal $V_{DD}$ of the contact terminal U10 first. Then, the contact type series regulator B3 starts working, and a relatively large pull-up current I2 is passed through the pull-up MOS transistor M2 of the contact type series regulator B3. However, initially, no RF signal power is fed through the pair of antenna terminals LA and LB, and the operation of the noncontact type shunt regulator B2 is kept stopped by the detection signal S1 output by the detector B4. Therefore, the pull-down current I1 of the pull-down MOS transistor M1 of the noncontact type shunt regulator B2 remains shut off. Upon the start of the action of the contact type series regulator B3, the voltage level of the inside source line $V_{DDA}$ is set to the upper-limit restriction level $V_C$ (=V2a) of the contact type series regulator B3.

After that, the RF signal power supply through the pair of antenna terminals LA and LB is started, and then the detection signal S1 output by the detector B4 starts the noncontact type shunt regulator B2 working. By starting the operation of the noncontact type shunt regulator B2 in this way, a relatively large pull-down current I1 is passed through the pull-down MOS transistor M1 of the noncontact type shunt regulator B2. In addition, as a result of the start of the operation of the noncontact type shunt regulator B2, an attempt to set the voltage level of the inside source line $V_{DDA}$ to the upper-limit restriction level $V_{CL}$ (=V1y) of the noncontact type shunt regulator B2 is made. However, at this point, the contact type series regulator B3 has begun working, and an attempt to set the voltage level of the inside source line $V_{DDA}$ to the upper-limit restriction level $V_C$ (=V2a) of the contact type series regulator B3 is made. At this point, the upper-limit restriction level $V_C$ (=V2a) of the contact type series regulator B3 is higher than the upper-limit restriction level $V_{CL}$ (=V1y) of the noncontact type shunt regulator B2 and therefore, the voltage level of the inside source line $V_{DDA}$ is set to the higher upper-limit restriction level $V_C$ (=V2a) of the contact type series regulator B3. During this, to keep the voltage level of the inside source line $V_{DDA}$ at the higher upper-limit restriction level $V_C$ (=V2a), a relatively larger pull-up current I2 is passed through the pull-up MOS transistor M2 in the contact type shunt regulator B3.

However, in this case, a relatively large pull-down current I1 is passed through the pull-down MOS transistor M1 of the noncontact type shunt regulator B2 and in parallel, a relatively large pull-up current I2 is passed through the pull-up MOS transistor M2 of the contact type series regulator B3. Thus, the action of the noncontact type shunt regulator B2 and the action of the contact type series regulator B3 compete against each other. In other words, as shown by the operation waveforms W4, W5 and W6 in the period T1 in FIG. 8, the pull-up current I2 and pull-down current I1 are caused to flow from the source-voltage terminal $V_{DD}$ to the ground terminal $V_{SS}$ and thus, a large volume of electric power is consumed.

Hence, the internal circuit U4 included in the semiconductor integrated circuit U2 shown in FIG. 1 is made to complete its action of signal processing (C-Processing), which the internal circuit U4 is executing using the signal-input/output terminal PIO, etc., while both the noncontact type shunt regulator B2 and the contact type series regulator B3 are left working. After the completion of the action, the upper-limit restriction level $V_C$ of the contact type series regulator B3 is changed from the high voltage level V2a to the low voltage level V2b in response to the control signal S3 showing that the power required for the internal circuit U4 to work is supplied through the pair of antenna terminals LA and LB. In this way, the pull-up current I2 of the pull-up MOS transistor M2 of the contact type series regulator B3 is cut. During this, to keep the voltage level of the inside source line $V_{DDA}$ at the upper-limit restriction level $V_{CL}$ (=V1y) of the lower level, a relatively large pull-down current I1 is passed through the pull-down MOS transistor M1 in the noncontact type shunt regulator B2.

After that, using an RF signal supplied through the pair of antenna terminals LA and LB, the internal circuit U4 of the semiconductor integrated circuit U2 shown in FIG. 1 conducts data transfer with the reader/writer U11. In this action, the internal circuit U4 operates using a source voltage which is produced by the rectifier B1 and noncontact type shunt regulator B2, and supplied through the inside source line $V_{DDA}$ Therefore, regardless of whether or not a power source is supplied through the source-voltage terminal $V_{DD}$ of the contact terminal U10, it becomes possible to execute a stable operation as in the above-mentioned case, and the communication performance thereof is never deteriorated.

<<Still Other Operation Waveforms of the Semiconductor Integrated Circuit>>

Figure 10:
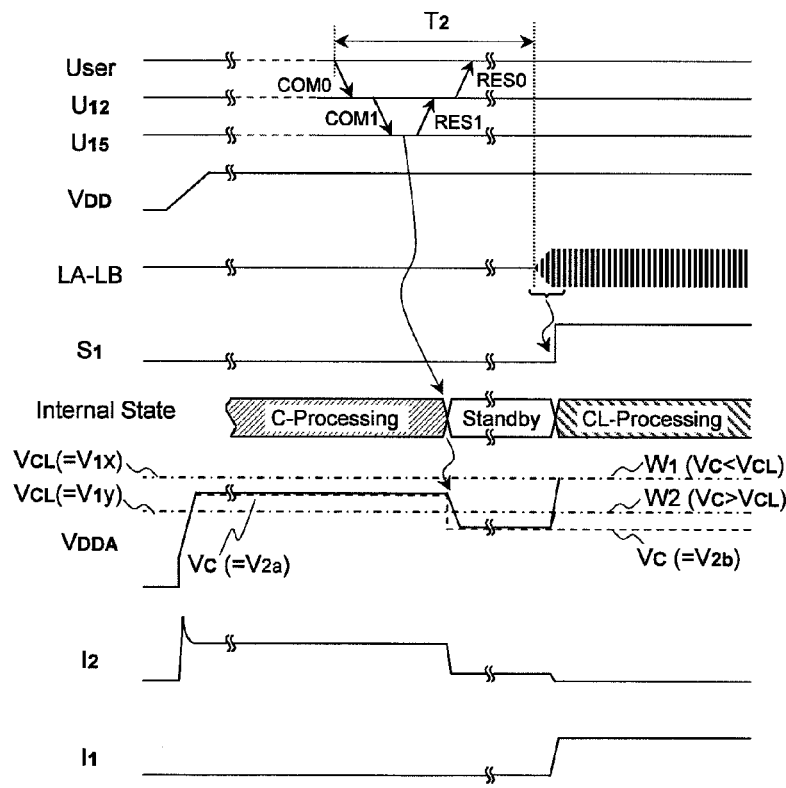
FIG. 10 is a diagram showing still other operation waveforms of the semiconductor integrated circuit shown in FIG. 1, which includes the power-supply circuit according to the second embodiment of the invention shown in FIG. 5.

FIG. 10 is a diagram showing still other operation waveforms of the semiconductor integrated circuit U2 shown in FIG. 1, which includes the power-supply circuit U3 according to the second embodiment of the invention shown in FIG. 5.

In the operation to be described with reference to FIG. 10, a user of the mobile terminal device U12 inputs an instruction COM0 for the noncontact operation mode before the RF signal power is supplied through the pair of antenna terminals LA and LB after supply of the source voltage through the source-voltage terminal $V_{DD}$ of the contact terminal U10.

As is clear from FIG. 10, a source voltage is supplied through the source-voltage terminal $V_{DD}$ of the contact terminal U10 first. Then, the contact type series regulator B3 starts working, and a relatively large pull-up current I2 is passed through the pull-up MOS transistor M2 of the contact type series regulator B3. However, initially no RF signal power is fed through the pair of antenna terminals LA and LB, and the operation of the noncontact type shunt regulator B2 has been left stopped by the detection signal S1 output by the detector B4. Therefore, the pull-down current I1 of the pull-down MOS transistor M1 of the noncontact type shunt regulator B2 remains shut off. Upon the start of the action of the contact type series regulator B3, the voltage level of the inside source line $V_{DDA}$ is set to the upper-limit restriction level $V_C$ (=V2a) of the contact type series regulator B3. During the time, the internal circuit U4 of the semiconductor integrated circuit U2 can execute data transfer with an device located outside through the signal-input/output terminal PIO and external contact terminal U10, using the source voltage set to the upper-limit restriction level $V_C$ (=V2a) supplied to the inside source line $V_{DDA}$ from the contact type series regulator B3.

After that, a user of the mobile terminal device U12 inputs an instruction COM0 for the noncontact operation mode before the RF signal power supply through the pair of antenna terminals LA and LB is started.

Specifically, in case that a user of the mobile terminal device U12 conducts communication using the antenna L1, he or she uses the input device U14 of the mobile terminal device U12 to input the instruction COM0 for the noncontact operation mode to the mobile terminal device U12. Then, in response to the instruction COM0, the mobile terminal device U12 delivers an instruction COM1 to the semiconductor integrated circuit U2 included in the noncontact electronic device U1 through the external contact terminal U10. The instruction COM1 is an instruction for shift from the contact mode to the noncontact operation mode. In response to the instruction COM1, the internal circuit U4 of the semiconductor integrated circuit U2 is made to go into Standby and in parallel, the upper-limit restriction level $V_C$ of the contact type series regulator B3 is changed from the high voltage level V2a to the low voltage level V2b according to the control signal S2 output by the controller B7. Hence, the drop of the upper-limit restriction level $V_C$ decreases the current value of the pull-up current I2 of the pull-up MOS transistor M2 of the contact type series regulator B3.

After that, the RF signal power supply through the pair of antenna terminals LA and LB is started, and then the detection signal S1 output by the detector B4 starts the noncontact type shunt regulator B2 working. By starting the operation of the noncontact type shunt regulator B2 in this way, a relatively large pull-down current I1 is passed through the pull-down MOS transistor M1 of the noncontact type shunt regulator B2. In addition, as a result of start of the operation of the noncontact type shunt regulator B2, an attempt to set the voltage level of the inside source line $V_{DDA}$ to the upper-limit restriction level $V_{CL}$ (=V1x or V1y) of the noncontact type shunt regulator B2 is made. However, at this point, the contact type series regulator B3 has begun working, and an attempt to set the voltage level of the inside source line $V_{DDA}$ to the upper-limit restriction level $V_C$ (=V2b) of the lower level of the contact type series regulator B3 is made. At this point, the upper-limit restriction level $V_C$ (=V2b) of the contact type series regulator B3 is lower than the upper-limit restriction level $V_{CL}$ (=V1x or V1y) of the noncontact type shunt regulator B2 and therefore, the voltage level of the inside source line $V_{DDA}$ is set to the upper-limit restriction level $V_{CL}$ (=V1x or V1y) of the higher level of the noncontact type shunt regulator B2. By setting the upper-limit restriction level $V_{CL}$ (=V1x or V1y) of the higher level of the noncontact type shunt regulator B2 for the voltage level of the inside source line $V_{DDA}$, the pull-up current I2 of the pull-up MOS transistor M2 of the contact type series regulator B3 is put in the cutoff state.

The internal circuit U4 of the semiconductor integrated circuit U2 shown in FIG. 1 thereafter executes data transfer with the reader/writer U11 using RF signals supplied through the pair of antenna terminals LA and LB. In this action, the internal circuit U4 works using a source voltage which has been produced by the rectifier B1 and noncontact type shunt regulator B2 and supplied thereto through the inside source line $V_{DDA}$. Therefore, regardless of whether or not a power source is supplied through the source-voltage terminal $V_{DD}$ of the contact terminal U10, it becomes possible to execute a stable operation as in the above-mentioned case, and the communication performance thereof is never deteriorated.

Third Embodiment

<<Details of Still Another Configuration of the Power-Supply Circuit>>

FIG. 11 is a diagram showing details of still another configuration of the power-supply circuit U3 included in the semiconductor integrated circuit U2 shown in FIG. 1 according to the third embodiment of the invention.

The power-supply circuit U3 shown in FIG. 11 includes a rectifier B1, a noncontact type shunt regulator B2, a contact type series regulator B3, a detector B4 and a controller B7, which are identical to those included in the power-supply circuit U3 shown in FIG. 5.

The power-supply circuit U3 shown in FIG. 11 is different from the power-supply circuit U3 shown in FIG. 5 in that the source voltage supplied to the source-voltage terminal $V_{DD}$ of the external contact terminal U10 is provided to the controller B7, and the control signal S2 produced by the controller B7 is delivered to the voltage divider B5 included in the noncontact type shunt regulator B2. The resistance ratio R1/R2 of voltage-dividing resistances R1 and R2 of the voltage divider B5 of the noncontact type shunt regulator B2 included in the power-supply circuit U3 shown in FIG. 11 is set according to the level of the control signal S2 variably. In contrast, the resistance ratio R3/R4 of the voltage-dividing resistances R3 and R4 of the voltage divider B3 of the contact type series regulator B3 included in the power-supply circuit U3 shown in FIG. 11 is not variably set according to the level of the control signal S2 as in the contact type series regulator B3 of FIG. 5, but set to a fixed value. Other parts of the configuration of the power-supply circuit U3 shown in FIG. 11 are the same as those of the power-supply circuit U3 shown in FIG. 5.

In a case where the source voltage supplied through the source-voltage terminal $V_{DD}$ of the external contact terminal U10 is at Low level (i.e. ground potential $V_{SS}$), the resistance ratio R1/R2 of the voltage-dividing resistances R1 and R2 of the voltage divider B5 of the noncontact type shunt regulator B2 is set to a small value. Therefore, the upper-limit restriction level $V_{CL}$ of the noncontact type shunt regulator B2 is set to a small value according to the following expression:

$$V_{CL}=V_{DDA}(\text{mini})=V_{R1}\cdot(R1+R2)/R2.$$

In a case where the source voltage supplied thorough the source-voltage terminal $V_{DD}$ of the external contact terminal U10 is at High level (i.e. equal to the source voltage $V_{DD}$), the resistance ratio R1/R2 of the voltage-dividing resistances R1 and R2 of the voltage divider B5 of the noncontact type shunt regulator B2 is set to a large value. Therefore, the upper-limit restriction level $V_{CL}$ of the noncontact type shunt regulator B2 is set to a large value according to the following expression:

$$V_{CL}=V_{DDA}(\text{mini})=V_{R1}\cdot(R1+R2)/R2.$$

FIG. 12 is a diagram showing the dependencies of the pull-up current I2 flowing through the pull-up MOS transistor M2 of the contact type series regulator B3, and the pull-down current I1 flowing through the pull-down MOS transistor M1 of the noncontact type shunt regulator B2 on the voltage of the inside source line $V_{DDA}$ in the power-supply circuit U3 shown in FIG. 11.

The upper portion of FIG. 12 shows the dependency of the pull-up current I2 flowing through the pull-up MOS transistor M2 of the contact type series regulator B3 of the power-supply circuit U3 of FIG. 11 on the voltage of the inside source line $V_{DDA}$. The dependency shown in FIG. 12 is exactly the same as the dependency of the pull-up current I2 flowing through the pull-up MOS transistor M2 of the contact type series regulator B3 of the power-supply circuit U3 of FIG. 3, which is presented above FIG. 4, on the voltage of the inside source line $V_{DDA}$.

The lower portion of FIG. 12 shows the dependency of the pull-down current I1 flowing through the pull-down MOS transistor M1 of the noncontact type shunt regulator B2 of the power-supply circuit U3 of FIG. 11 on the voltage of the inside source line $V_{DDA}$.

The broken line I1$a$ in the lower portion of FIG. 12 shows the dependency of the pull-down current I1 flowing through the pull-down MOS transistor M1 of the noncontact type shunt regulator B2 on the voltage of the inside source line $V_{DDA}$ in a case where the source voltage supplied through the source-voltage terminal $V_{DD}$ of the external contact terminal U10 is at Low level (i.e. ground potential $V_{SS}$). In this case, the resistance ratio R1/R2 of the voltage-dividing resistances R1 and R2 of the voltage divider 35 is set to a small value according to the control signal S2 produced by the controller B7. Further, the upper-limit restriction level $V_{CL}$ (=V1$a$) of the noncontact type shunt regulator B2 in this case is set to a small value according to the following expression:

$$V_{CL}=V_{DDA}(\text{mini})=V_{R1}\cdot(R1+R2)/R2.$$

Hence, the first set voltage level V1$a$, which is the upper-limit restriction level $V_{CL}$ of the noncontact type shunt regulator B2, is set to a small value. For example, the first set voltage level V1$a$ set to a small value is set to be substantially the same level as the second set voltage level V2, which is the upper-limit restriction level $V_C$ of the contact type series regulator B3.

On the other hand, the solid line I1$b$ in the lower portion of FIG. 12 shows the dependency of the pull-down current I1 flowing through the pull-down MOS transistor M1 of the noncontact type shunt regulator B2 on the voltage of the inside source line $V_{DDA}$ in a case where the source voltage supplied through the source-voltage terminal $V_{DD}$ of the external contact terminal U10 is at High level (i.e. equal to the source voltage $V_{DD}$). In this case, the resistance ratio R1/R2 of the voltage-dividing resistances R1 and R2 is set to a large value according to the control signal S2 produced by the controller B7. The upper-limit restriction level $V_{CL}$ (=V1$b$) of the noncontact type shunt regulator B2 in this case is set to a large value according to the following expression:

$$V_{CL}=V_{DDA}(\text{mini})=V_{R1}\cdot(R1+R2)/R2.$$

Thus, the first set voltage level V1$b$, which is the upper-limit restriction level $V_{CL}$ of the noncontact type shunt regulator B2, is set to a large value. For example, the first set voltage level V1$b$ set to a large value is higher than the first set voltage level V1$a$, which is the upper-limit restriction level $V_{CL}$ of the noncontact type shunt regulator B2, by a predetermined voltage difference DV3.

As a result, a large pull-down current I1 going through the pull-down MOS transistor M1 of the noncontact type shunt regulator B2, and a large pull-up current I2 going through the pull-up MOS transistor M2 of the contact type series regulator B3 are prevented from being caused concurrently in response to source voltages of identical levels supplied to the inside source line $V_{DDA}$.

In the steps of setting the upper-limit restriction levels $V_C$ and $V_{CL}$, the second set voltage level V2 for the upper-limit restriction level $V_C$, and the first set voltage levels V1$a$ and V1$b$ for the upper-limit restriction level $V_{CL}$, are set to voltage values higher than the minimum working voltage $V_M$ of the internal circuit U4 which works using a source voltage supplied to the inside source line $V_{DDA}$, and lower than the breakdown voltage $V_N$ of an elemental device included in the internal circuit U4 which works using a source voltage supplied to the inside source line $V_{DDA}$.

Fourth Embodiment

<<Details of Another Configuration of the Power-Supply Circuit>>

FIG. 13 is a diagram showing details of another configuration of the power-supply circuit U3 included in the semiconductor integrated circuit U2 shown in FIG. 1 according to the fourth embodiment of the invention.

The power-supply circuit U3 shown in FIG. 13 includes a rectifier B1, a noncontact type shunt regulator B2, a contact type series regulator B3, a detector B4 and a controller B7, which are identical to those included in the power-supply circuit U3 shown in FIG. 11.

The power-supply circuit U3 shown in FIG. 13 is different from the power-supply circuit U3 shown in FIG. 11 in that the resistance ratio R3/R4 of the voltage-dividing resistances R3 and R4 of the voltage divider B3 of the contact type series regulator B3 included in the power-supply circuit U3 shown in FIG. 13 is not set to a fixed value as in the contact type series regulator B3 shown in FIG. 11, and not variably set according to the level of the control signal S2 as in the contact type series regulator B3 shown in FIG. 5, but set to a fixed value.

Specifically, the upper-limit restriction level $V_C$ of the contact type series regulator B3 of the power-supply circuit U3 shown in FIG. 13 is set according to the following expression:

$$V_C=V_{DDA}(\text{mini})=V_{R2}\cdot(R3+R4)/R4.$$

Therefore, in a case where no RF signal is supplied through the pair of antenna terminals LA and LB, the noncontact type shunt regulator B2 is controlled into the non-working condition according to the detection signal S1 from the detector B4 and at this point, the resistance ratio R3/R4 of the voltage-dividing resistances R3 and R4 is set to a large value according to the control signal S2 produced by the controller B7, in the voltage divider B6 included in the contact type series regulator B3. The upper-limit restriction level $V_C$ of the contact type series regulator B3 at this point, is set to a large value according to the following expression:

$$V_C=V_{DDA}(\text{mini})=V_{R2}\cdot(R3+R4)/R4.$$

In contrast, under the condition that an RF signal is being supplied through the pair of antenna terminals LA and LB, the noncontact type shunt regulator B2 is controlled into the working condition according to the detection signal S1 from the detector B4; the resistance ratio R3/R4 of the voltage-dividing resistances R3 and R4 is set to a small value according to the control signal S2 produced by the controller B7 at this point, in the voltage divider B6 included in the contact type series regulator B3. As a result, the upper-limit restriction level $V_C$ of the contact type series regulator B3 is set to a small value according to the following expression:

$$V_C=V_{DDA}(\text{mini})=V_{R2}\cdot(R3+R4)/R4.$$

Other parts of the configuration of the power-supply circuit U3 shown in FIG. 13 are the same as those of the power-supply circuit U3 shown in FIG. 11. In other words, the resistance ratio R1/R2 of the voltage-dividing resistances R1 and R2 of the voltage divider B5 of the noncontact type shunt regulator B2 included in the power-supply circuit U3 shown in FIG. 13 is variably set according to the level of the control signal S2 exactly in the same way as the power-supply circuit U3 shown in FIG. 11.

Therefore, also with the power-supply circuit U3 shown in FIG. 13, in a case where the source voltage supplied through the source-voltage terminal $V_{DD}$ of the external contact terminal U10 is at Low level (i.e. ground potential $V_{SS}$), the resistance ratio R1/R2 of the voltage-dividing resistances R1 and R2 of the voltage divider B5 of the noncontact type shunt regulator B2 is set to a small value. Therefore, the upper-limit restriction level $V_{CL}$ of the noncontact type shunt regulator B2 is set to a small value according to the following expression:

$V_{CL}=V_{DDA}(\text{mini})=V_{R1}\cdot(R1+R2)/R2.$

Further, also with the power-supply circuit U3 shown in FIG. 13, in a case where the source voltage supplied thorough the source-voltage terminal $V_{DD}$ of the external contact terminal U10 is at High level (i.e. equal to the source voltage $V_{DD}$), the resistance ratio R1/R2 of the voltage-dividing resistances R1 and R2 of the voltage divider B5 of the noncontact type shunt regulator B2 is set to a large value. Therefore, the upper-limit restriction level $V_{CL}$ of the noncontact type shunt regulator B2 is set to a large value according to the following expression:

$V_{CL}=V_{DDA}(\text{mini})=V_{R1}\cdot(R1+R2)/R2.$

FIG. 14 is a diagram showing the dependencies of the pull-up current I2 flowing through the pull-up MOS transistor M2 of the contact type series regulator B3, and the pull-down current I1 flowing through the pull-down MOS transistor M1 of the noncontact type shunt regulator B2 on the voltage of the inside source line $V_{DDA}$ in the power-supply circuit U3 shown in FIG. 13.

The upper portion of FIG. 14 shows the dependency of the pull-up current I2 flowing through the pull-up MOS transistor M2 of the contact type series regulator B3 of the power-supply circuit U3 of FIG. 13 on the voltage of the inside source line $V_{DDA}$.

The broken curve I2a in the upper portion of FIG. 14 shows the dependency of the pull-up current I2 flowing through the pull-up MOS transistor M2 of the contact type series regulator B3 on the voltage of the inside source line $V_{DDA}$ in a case where the noncontact type shunt regulator B2 is controlled into the non-working condition according to the detection signal S1 from the detector B4 under the condition that no RF signal is being supplied through the pair of antenna terminals LA and LB. In this case, the resistance ratio R3/R4 of the voltage-dividing resistances R3 and R4 in the voltage divider B6 is set to a large value according to the control signal S2 produced by the controller B7. Further, the upper-limit restriction level $V_C$ of the contact type series regulator B3 in this case is set to a large value according to the following expression:

$V_C=V_{DDA}(\text{mini})=V_{R2}\cdot(R3+R4)/R4.$

Thus, the second set voltage level V2a, which is the upper-limit restriction level $V_C$ of the contact type series regulator B3, is set to a large value. For example, the second set voltage level V2a set to a large value is substantially the same as the first set voltage level V1a, which is the upper-limit restriction level $V_{CL}$ of the noncontact type shunt regulator B2.

On the other hand, the solid line I2b in the upper portion of FIG. 14 shows the dependency of the pull-up current I2 flowing through the pull-up MOS transistor M2 of the contact type series regulator B3 on the voltage of the inside source line $V_{DDA}$ in a case where the noncontact type shunt regulator B2 is controlled into the working condition according to the detection signal S1 from the detector B4 under the condition that an RF signal is being supplied through the pair of antenna terminals LA and LB. In this case, the resistance ratio R3/R4 of the voltage-dividing resistances R3 and R4 in the voltage divider B6 is set to a small value according to the control signal S2 produced by the controller B7. Further, the upper-limit restriction level $V_C$ of the contact type series regulator B3 in this case is set to a small value according to the following expression:

$V_C=V_{DDA}(\text{mini})=V_{R2}\cdot(R3+R4)/R4.$

Thus, the second set voltage level V2b, which is the upper-limit restriction level $V_C$ of the contact type series regulator B3, is set to a small value. For example, the second set voltage level V2b set to a small value is lower than the first set voltage level V1a, which is the upper-limit restriction level $V_{CL}$ of the noncontact type shunt regulator B2.

The lower portion of FIG. 14 shows the dependency of the pull-down current I1 flowing through the pull-down MOS transistor M1 of the noncontact type shunt regulator B2 of the power-supply circuit U3 of FIG. 13 on the voltage of the inside source line $V_{DDA}$.

The broken line I1a in the lower portion of FIG. 14 shows the dependency of the pull-down current I1 flowing through the pull-down MOS transistor M1 of the noncontact type shunt regulator B2 on the voltage of the inside source line $V_{DDA}$ in a case where the source voltage supplied through the source-voltage terminal $V_{DD}$ of the external contact terminal U10 is at Low level (i.e. ground potential $V_{SS}$). In this case, the resistance ratio R1/R2 of the voltage-dividing resistances R1 and R2 of the voltage divider B5 is set to a small value according to the control signal S2 produced by the controller B7. Further, the upper-limit restriction level $V_{CL}$ (=V1a) of the noncontact type shunt regulator B2 in this case is set to a small value according to the following expression:

$V_{CL}=V_{DDA}(\text{mini})=V_{R1}\cdot(R1+R2)/R2.$

Hence, the first set voltage level V1a, which is the upper-limit restriction level $V_{CL}$ of the noncontact type shunt regulator B2, is set to a small value. For example, the first set voltage level V1a set to a small value is set to be substantially the same level as the second set voltage level V2, which is the upper-limit restriction level $V_C$ of the contact type series regulator B3.

On the other hand, the solid line I1b in the lower portion of FIG. 14 shows the dependency of the pull-down current I1 flowing through the pull-down MOS transistor M1 of the noncontact type shunt regulator B2 on the voltage of the inside source line $V_{DDA}$ in a case where the source voltage supplied through the source-voltage terminal $V_{DD}$ of the external contact terminal U10 is at High level (i.e. equal to the source voltage $V_{DD}$). In this case, the resistance ratio R1/R2 of the voltage-dividing resistances R1 and R2 is set to a large value according to the control signal S2 produced by the controller B7. The upper-limit restriction level $V_{CL}$ (=V1b) of the noncontact type shunt regulator B2 in this case is set to a large value according to the following expression:

$V_{CL}=V_{DDA}(\text{mini})=V_{R1}\cdot(R1+R2)/R2.$

Thus, the first set voltage level V1b, which is the upper-limit restriction level $V_{CL}$ of the noncontact type shunt regulator B2, is set to a large value. For example, the first set voltage level V1b set to a large value is higher than the first set voltage level V1a, which is the upper-limit restriction level $V_{CL}$ of the noncontact type shunt regulator B2.

Therefore, with the power-supply circuit U3 shown in FIG. 13, in the condition that an RF signal is supplied through the pair of antenna terminals LA and LB, and the source voltage supplied through the source-voltage terminal $V_{DD}$ of the external contact terminal U10 is at High level (i.e. equal to the source voltage $V_{DD}$) the second set voltage level V2b, which is the upper-limit restriction level $V_C$ of the contact type series regulator B3, is set to a small value, and the first set voltage level V1b, which is the upper-limit restriction level $V_{CL}$ of the noncontact type shunt regulator B2, is set to a large value. The difference between the first and second set voltage levels V1b and V2b becomes a predetermined voltage difference DV4.

However, as to the power-supply circuit U3 shown in FIG. 13, under the condition that no RF signal is supplied through the pair of antenna terminals LA and LB, and the source voltage supplied through the source-voltage terminal $V_{DD}$ of the external contact terminal U10 is at High level (i.e. equal to the source voltage $V_{DD}$), the second set voltage level V2a, which is the upper-limit restriction level $V_C$ of the contact type series regulator B3, is set to a large value, and the first set voltage level V1b, which is the upper-limit restriction level $V_{CL}$ of the noncontact type shunt regulator B2, is set to a large value. The difference between the first and second set voltage levels V1b and V2a becomes substantially half of the predetermined voltage difference DV4.

Further, with the power-supply circuit U3 shown in FIG. 13, under the condition that an RF signal is supplied through the pair of antenna terminals LA and LB, and the source voltage supplied through the source-voltage terminal $V_{DD}$ of the external contact terminal U10 is at Low level (i.e. ground potential $V_{SS}$), the second set voltage level V2b, which is the upper-limit restriction level $V_C$ of the contact type series regulator B3, is set to a small value, and the first set voltage level V1a, which is the upper-limit restriction level $V_{CL}$ of the noncontact type shunt regulator B2, is set to a small value. The difference between the first and second set voltage levels V1a and V2b becomes substantially half of the predetermined voltage difference DV4.

Consequently, in regard to the power-supply circuit U3 shown in FIG. 13, in the condition that an RF signal is supplied through the pair of antenna terminals LA and LB, and the source voltage supplied through the source-voltage terminal $V_{DD}$ of the external contact terminal U10 is at High level (i.e. equal to the source voltage $V_{DD}$), the difference between the second set voltage level V2b and first set voltage level V1b becomes the maximum predetermined voltage difference DV4. The maximum predetermined voltage difference DV4 can be secured sufficiently even in the case where there are a manufacturing variation, temperature change, source voltage fluctuation, and a change in receive signal level of RF signals in the semiconductor integrated circuit U2. Therefore, a large pull-down current I1 going through the pull-down MOS transistor M1 of the noncontact type shunt regulator B2, and a large pull-up current I2 going through the pull-up MOS transistor M2 of the contact type series regulator B3 are surely prevented from being caused concurrently in response to source voltages of an identical level supplied to the inside source line $V_{DDA}$.

In the action for such prevention, the second set voltage levels V2a and V2b for the upper-limit restriction level $V_C$, and the first set voltage levels V1a and V1b for the upper-limit restriction level $V_{CL}$ are set to voltage values higher than the minimum working voltage $V_M$ of the internal circuit U4 which works using a source voltage supplied to the inside source line $V_{DDA}$, and lower than the breakdown voltage $V_N$ of an elemental device included in the internal circuit U4 which works using a source voltage supplied to the inside source line $V_{DDA}$.

While the invention made by the inventor has been concretely described above based on various embodiments thereof, it is not limited to the embodiments. It is needless to say that various changes and modifications may be made without departing from the scope thereof.

For example, the circuit configurations of the noncontact type shunt regulator B2 and contact type series regulator B3 shown in FIGS. 3, 5, 11 and 13 are not limited to the concrete examples shown in the drawings, and various changes and modifications thereof are possible.

In addition, the reference voltage source $V_{R1}$ of the noncontact type shunt regulator B2, and the reference voltage source $V_{R2}$ of the contact type series regulator B3 may be constituted by a common reference voltage source shared between them.

The noncontact electronic device having therein a semiconductor integrated circuit according to the embodiment of the invention can be incorporated in not only mobile phone terminal devices and portable music players, but also mobile terminal devices, such as PDAs (Personal Digital Assistants), which are able to work on batteries in general.

What is claimed is:

1. A semiconductor integrated circuit comprising:
a pair of antenna terminals connectable with an antenna;
a rectifier operable to rectify a radio frequency signal supplied through the pair of antenna terminals thereby to output a direct-current voltage to an inside source line;
a source-voltage terminal for supply of a source voltage from outside;
a shunt regulator including a pull-down transistor connected between the inside source line and a ground, and passing a pull-down current through the pull-down transistor in response to a rise of a voltage of the inside source line to or above a first set voltage; and
a series regulator including a pull-up transistor connected between the source-voltage terminal and inside source line, and passing a pull-up current through the pull-up transistor in response to a fall of the voltage of the inside source line to or below a second set voltage,
wherein the first set voltage is set to be higher than the second set voltage in voltage level.

2. The semiconductor integrated circuit according to claim 1, wherein the shunt regulator further includes a first voltage divider connected between the inside source line and ground, and a first operational amplifier operable to control an input terminal of the pull-down transistor according to a divided voltage output from the first voltage divider and a first reference voltage, and
the series regulator further includes a second voltage divider connected between the inside source line and the ground, and a second operational amplifier operable to control an input terminal of the pull-up transistor according to a divided voltage output from the second voltage divider and a second reference voltage.

3. The semiconductor integrated circuit according to claim 2, wherein the pull-down transistor is an N-channel MOS transistor, and
the pull-up transistor is a P-channel MOS transistor.

4. A semiconductor integrated circuit comprising:
a pair of antenna terminals connectable with an antenna;
a rectifier operable to rectify a radio frequency signal supplied through the pair of antenna terminals thereby to output a direct-current voltage to an inside source line;
a source-voltage terminal for supply of a source voltage from outside;
a shunt regulator including a pull-down transistor connected between the inside source line and a ground, and passing a pull-down current through the pull-down transistor in response to a rise of a voltage of the inside source line to or above a first set voltage;

a series regulator including a pull-up transistor connected between the source-voltage terminal and inside source line, and passing a pull-up current through the pull-up transistor in response to a fall of the voltage of the inside source line to or below a second set voltage; and a control section connected with the shunt regulator and series regulator, wherein the control section can control a voltage level of the first set voltage into a level higher than a voltage level of the second set voltage in case that the shunt and series regulators work in parallel.

5. The semiconductor integrated circuit according to claim 4, wherein the shunt regulator further includes a first voltage divider connected between the inside source line and ground, and a first operational amplifier operable to control an input terminal of the pull-down transistor according to a divided voltage output from the first voltage divider and a first reference voltage, and the series regulator further includes a second voltage divider connected between the inside source line and the ground, and a second operational amplifier operable to control an input terminal of the pull-up transistor according to a divided voltage output from the second voltage divider and a second reference voltage.

6. The semiconductor integrated circuit according to claim 5, wherein the control section is arranged to be able to detect supply of the radio frequency signal to the pair of antenna terminals, and the control section can control the second voltage divider of the series regulator according to a result of detection of the supply of the radio frequency signal thereby to control the voltage level of the second set voltage into a level lower than the voltage level of the first set voltage.

7. The semiconductor integrated circuit according to claim 5, wherein the control section is arranged to be able to detect supply of the source voltage to the source-voltage terminal, and the control section can control the first voltage divider of the shunt regulator according to a result of detection of the supply of the source voltage thereby to control the voltage level of the first set voltage into a level higher than the voltage level of the second set voltage.

8. The semiconductor integrated circuit according to claim 5, wherein the control section is arranged to be able to detect supply of the radio frequency signal to the pair of antenna terminals, and to detect supply of the source voltage to the source-voltage terminal, the control section can control the second voltage divider of the series regulator according to a result of detection of the supply of the radio frequency signal thereby to control the voltage level of the second set voltage into a level lower than the voltage level of the first set voltage, and the control section can control the first voltage divider of the shunt regulator according to a result of detection of the supply of the source voltage thereby to control the voltage level of the first set voltage into a level higher than the voltage level of the second set voltage.

9. The semiconductor integrated circuit according to claim 8, wherein the pull-down transistor is an N-channel MOS transistor, and the pull-up transistor is a P-channel MOS transistor.

10. A noncontact/contact electronic device comprising:

an antenna;

a contact terminal for supply of a source voltage from outside; and a semiconductor integrated circuit, wherein the semiconductor integrated circuit is identical to the semiconductor integrated circuit according to claim 1.

11. A mobile terminal device comprising:

a data-processing circuit operable to handle data;

a data input device operable to accept input of the data to be handled by the data-processing circuit;

a display device operable to display the data to be handled by the data-processing circuit; and a noncontact/contact electronic device identical to the noncontact/contact electronic device according to claim 10, and capable of being incorporated in the mobile terminal device.

* * * * *